(12) United States Patent
Mishra et al.

(10) Patent No.: US 11,568,046 B2
(45) Date of Patent: Jan. 31, 2023

(54) TRIGGER ACTIVATION BY REPEATED MAXIMAL CLIQUE SAMPLING

(71) Applicant: University of Florida Research Foundation, Inc., Gainesville, FL (US)

(72) Inventors: Prabhat Kumar Mishra, Gainesville, FL (US); Yangdi Lyu, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 340 days.

(21) Appl. No.: 16/893,701

(22) Filed: Jun. 5, 2020

(65) Prior Publication Data

US 2021/0004459 A1 Jan. 7, 2021

Related U.S. Application Data

(60) Provisional application No. 62/869,294, filed on Jul. 1, 2019.

(51) Int. Cl.
*G06F 21/55* (2013.01)
*G01R 31/317* (2006.01)

(52) U.S. Cl.
CPC ..... *G06F 21/554* (2013.01); *G01R 31/31719* (2013.01); *G06F 2221/034* (2013.01)

(58) Field of Classification Search
CPC ............. G06F 21/554; G06F 2221/034; G06F 21/577; G06F 30/33; G01R 31/31719
See application file for complete search history.

(56) References Cited

U.S. PATENT DOCUMENTS

| | | | |
|---|---|---|---|
| 2004/0236576 A1* | 11/2004 | Thiesson | G10L 15/08 704/255 |
| 2016/0349314 A1* | 12/2016 | Dubrova | G01R 31/318335 |
| 2018/0101783 A1* | 4/2018 | Savkli | G06K 9/6224 |
| 2019/0230113 A1* | 7/2019 | Al Faruque | H04L 63/1433 |
| 2019/0347417 A1* | 11/2019 | Tehranipoor | G06F 21/566 |

(Continued)

OTHER PUBLICATIONS

Li et al, "Mining Maximal Clique Summary with Effective Sampling", 2019, IEEE international Conference on Data Mining, p. 1-6.*

(Continued)

*Primary Examiner* — Christopher A Revak
(74) *Attorney, Agent, or Firm* — Thomas | Horstemeyer, LLP

(57) ABSTRACT

An exemplary method for generating a test vector to activate a Trojan triggering condition includes the operations of obtaining a design graph representation of an electronic circuit; constructing a satisfiability graph from the design graph representation, wherein the satisfiability graph includes a set of vertices representing rare signals of the electronic circuit and satisfiability connections between the vertices; finding a plurality of maximal satisfiable cliques in the satisfiability graph, wherein a maximal satisfiable clique corresponds to a triggering condition for a payload of the electronic circuit; generating a test vector for each of the maximal satisfiable cliques; and performing a test for the presence of a hardware Trojan circuit in the electronic circuit using the generated test vectors as input signals.

20 Claims, 15 Drawing Sheets

(56) References Cited

U.S. PATENT DOCUMENTS

2020/0104485 A1* 4/2020 Crouch ............... G06F 21/554
2021/0073287 A1* 3/2021 Hunter ............... H04L 9/3239

OTHER PUBLICATIONS

Lyu et al, "Automated Trigger Activation by Repeated Maximal Clique Sampling", 2020, IEEE, p. 482-487.*

Lyu et al., "Scalable Activation of Rare Triggers in Hardware Trojans by Repeated Maximal Clique Sampling", Jul. 2021, IEEE Transactions on Computer-Aided Design of Intergrated Circuits and Systems, p. 1287-1300.*

J. Aarestad et al. "Detecting Trojans Through Leakage Current Analysis Using Multiple Supply Pad IDDQS." IEEE Transactions on information Forensics and Security, 5(4):893-904, Dec. 2010.

D. Agrawal et al., "Trojan Detection using IC Fingerprinting." in 2007 IEEE Symposium on Security and Privacy (SP'07), pp. 296-310, May 2007.

A. Ahmed et al. "Scalable Hardware Trojan Activation by Interleaving Concrete Simulation and Symbolic Execution." In IEEE International Test Conference, pp. 1-10, (ITC), 2018.

M. E. Amyeen et al. "Evaluation of the Quality of N-Detect Scan ATPG Patterns on a Processor." In 2004 International Conferce on Test, pp. 669-678, Oct. 2004.

A. Bazzazi et al. "Hardware Trojan Detection Based on Logical Testing." J, Electron. Test., 33(4):381-395, Aug. 2017.

X. Chen et al. "A General Framework for Hardware Trojan Detection in Digital Circuits by Statistical Learning Algorithms." IEEE Transactions on Computer-Aided Design of Integrated Circuits and Systems. 36(10):1633-1646, Oct. 2017.

Y. Huang et al. "Scalable Test Generation for Trojan Detection Using Side Channel Analysis." IEEE Transactions on Information Forensics and Security, 13(11):2746-2760, Nov. 2018.

Y. Jin et al. "Hardware Trojan Detection Using Path Delay Fingerprint." In 2008 IEEE International Workshop on Hardware-Oriented Security and Trust, pp. 51-57, Jun. 2008.

A. Kulkarni et al, "Adaptive Real-time Trojan Detection Framework through Machine Learning," In 2016 IEEE International Symposium on Hardware Oriented Security and Trust (HOST), pp. 120-123, May 2016.

M. A. Nourian et al. "Hardware Trojan Detection Using an Advised Genetic Algorithm Based Logic Testing." Journal of Electronic Testing, 34(4):461-470, Aug. 2018.

L. Shen et al. "Symbolic execution based test-patterns generation algorithm for hardware Trojan detection." Computers Security, 78:267-280, 2018.

A.Waksman et al. "Fanci: Identification of Stealthy Malicious Logic Using Boolean Functional Analysis." In Proceedings of the 2013 ACM SIGSAC Conference on Computer & Communications Security; CCS '13, pp. 697-708, 2013.

F. Wolff et ai. "Towards Trojan-Free Trusted ICS: Problem Analysis and Detection Scheme." In 2008 Design, Automation and Test in Europe, pp. 1362-1365, Mar. 2008.

G. Zarrinchian et al. "Latch-Based Structure: A High Resolution and Self-Reference Technique for Hardware Trojan Detection." IEEE Transactions on Computers, 66(1):100-113, Jan. 2017.

R. S. Chakraborty et al. "Mero: A statistical Approach for Hardware Trojan Detection." In C. Clavier and K. Gaj, editors, Cryptographic Hardware and Embedded Systems—CHES 2009, pp. 396-410, Springer Berlin Heidelberg, 2009.

Sayandeep Saha et al. "improved Test Pattern Generation for Hardware Trojan Detection Using Genetic Algorithm and Boolean Satisfiability." 577-596, CHES 2015.

* cited by examiner (a) c2670 [1]

(b) MIPS Processor [3]

(a) TARMAC (Our Approach)

(b) MERO [14]

(a) MIPS (b) AES

TRIGGER ACTIVATION BY REPEATED MAXIMAL CLIQUE SAMPLING

CROSS-REFERENCE TO RELATED APPLICATION

This application claims priority to U.S. provisional application entitled, "Trigger Activation By Repeated Maximal Clique Sampling," having Ser. No. 62/869,294, filed Jul. 1, 2019, which is entirely incorporated herein by reference.

TECHNICAL FIELD

The present disclosure is generally related to the detection of a malicious modification of circuitry in an integrated circuit.

BACKGROUND

Hardware Trojans are serious threat to security and reliability of computing systems. It is hard to detect these malicious implants using traditional validation methods, since an adversary is likely to hide them under rare trigger conditions. While existing statistical test generation methods are promising for Trojan detection, they are not suitable for activating extremely rare trigger conditions in stealthy Trojans.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

In accordance with various embodiments of the present disclosure, a new test generation paradigm has been developed by mapping a trigger activation problem to a clique cover problem. In accordance with various embodiments, a satisfiability solver operation is utilized to construct a test corresponding to each maximal clique, in which test vectors generated by covering maximal cliques are guaranteed to be complete and compact. Accordingly, the present disclosure presents techniques for generating efficient directed tests to activate trigger conditions by repeated maximal clique sampling. Methods and systems implementing such processes outperform state-of-the-art approaches by several orders-of-magnitude in detecting stealthy Trojans.

Figure 1:
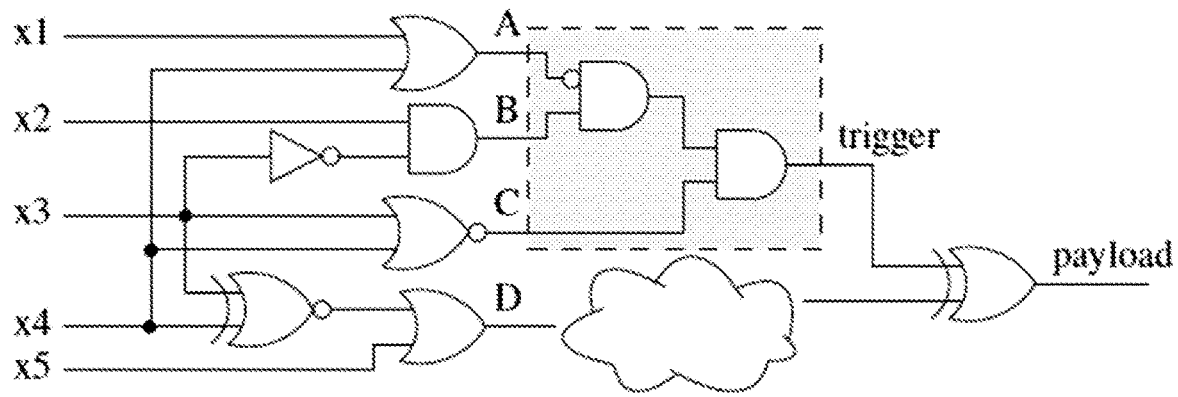
FIG. 1 is a diagram of an example hardware Trojan of an integrated circuit with a trigger condition constructed by three rare signals (A, B, C) in accordance with embodiments of the present disclosure.

A hardware Trojan is a malicious implant in System-of-Chip (SoC) designs. Due to increasing complexity and stringent time-to-market constraints, a SoC supply chain involves multiple third parties. Reusable Intellectual Property (IP) based SoC design methodology is cost effective, but introduces trust and security concerns. A malicious third-party can insert hardware Trojans during any stages in the development cycle starting from design implementation to fabrication. Such malicious modifications may alter the original functionality or leak secret information. To remain covert under in-field testing, a hardware Trojan is typically designed to be triggered by an extremely rare circuit input event. An example hardware Trojan is shown in FIG. 1 with a corresponding trigger and payload. In particular, the figure illustrates an example hardware Trojan (within the dashed box) of an integrated circuit with a trigger condition constructed by three rare signals (A, B, C). An attacker can construct a valid trigger condition with (A==0∧B==1∧C==1). When this rare condition is satisfied, the value of payload is changed. The alteration of the payload can introduce a malfunction or an information leakage. Accordingly, the trigger condition is usually constructed by a few signals that can be activated under rare conditions.

The figure illustrates a beneficial way to assemble the rare signals (A, B, and C) to form a rare input event. If the selected signals are independent, a probability of triggering this condition is multiplication of all the probabilities of these signals. Due to the stealthy nature of these Trojans, the trigger condition will not be activated during a traditional validation and regression testing. Once the trigger condition is activated, the effects of the hardware Trojan can flip the value of the payload, which could be a signal to control the privilege, alter an important function, or send secret information to the outside. Therefore, it is paramount to have efficient validation approaches that can activate rare trigger conditions to enable Trojan detection.

To detect hardware Trojans, various approaches have been proposed including logic testing, side-channel analysis, and different learning techniques. However, existing approaches are neither effective nor scalable to large designs with extremely rare trigger conditions. Logic testing requires test vectors to fully activate a trigger condition and also propagate the effects to observable outputs. In contrast to logic testing, side-channel analysis detects hardware Trojans by observing the side effects of inserted gates. Since the Trojans are very small (few gates in a million-gate design), their side-channel footprint can easily hide within process variation and environmental noise margins. Although side-channel analysis does not require activation of trigger conditions, the activation could significantly improve side-channel sensitivity. Therefore, trigger activation is a fundamental problem in both logic testing and side-channel analysis based Trojan detection.

Trigger activation is a major challenge due to the exponentially large space that an adversary can exploit to construct trigger conditions. Conventional validation approaches simulate the design using millions or billions of random/constrained-random test vectors, and hope that one of these tests will activate the trigger condition. MERO (Multiple Excitation of Rare Occurrence) is one of the effective constrained-random test generation approaches. It starts with a large number of random vectors, and flips bits to increase N-detect criteria. MERO is useful for small benchmarks, but not effective in large designs with extremely rare trigger conditions. Existing directed test generation techniques are beneficial for known targets, but not useful for unknown targets (trigger conditions), since it leads to exponential complexity.

For the present disclosure, it is assumed that trigger conditions are constructed from rare signals. This assumption is widely used in existing literature and is a reasonable assumption, since an adversary wants the trigger condition to be covert under millions of random tests during traditional validation. The adversary also wants to keep the number of trigger points small to avoid introduction of a noticeable area/power anomaly compared to the original design, where the number of signals from the original design that is used to construct a trigger condition is called trigger points. A combination of rare signals can achieve both goals. For example, with four independent rare signals each having an activation probability lower than 1%, the activation probability of the trigger is less than $10^{-8}$. With non-rare signals, e.g. activation probability of 10%, at least eight of them are needed to construct a trigger condition with the same activation probability, increasing the extra trigger area by twice. When an attacker uses only non-rare signals, or a combination of rare and non-rare signals, its likelihood of detection is higher compared to the same-size trigger constructed using only rare signals. Although selecting trigger conditions from rare signals seems to be a naive choice for attackers, it is still infeasible for debug engineers to try all possible combinations of signals. For example, in a design with 1,000 rare signals, such as the MIPS (Microprocessor without Interlocked Pipelined Stages) processor, debug engineers need to check $O(2^{1000})$ possible combinations, which is infeasible to finish within a typical debug budget. Therefore, the rareness assumption gives an attacker the advantage to bypass a traditional functional validation, minimize the trigger area, and still leave enough choices for trigger conditions.

Random and constrained-random tests are widely used in traditional functional validation methodology. Unfortunately, even billions or trillions of constrained-random tests cannot cover many complex and corner-case scenarios in today's industrial designs. Directed tests are promising in such cases to activate the specific targets that were not covered by random or constrained-random tests. There are a wide variety of directed test generation techniques for functional validation, such as some recent efforts in Trojan detection using concolic testing. Unfortunately, these techniques are not beneficial for extremely rare trigger conditions, since they lead to exponential complexity. For example, even for a small ISCAS (IEEE International Symposium on Circuits and Systems) benchmark (c880 with only 451 gates), there are approximately $10^{11}$ triggers possible with only four trigger points. The number would be exponentially higher if one considers triggers with different number of trigger points. Clearly, it is infeasible to generate and apply so many directed tests to activate Trojan triggers even for a tiny benchmark. Therefore, directed test generation is not useful for activating trigger conditions in large designs.

Statistical test generation is a promising alternative to directed tests. The basic idea is to activate the rare signals as much as possible (one or more at a time) to increase the likelihood of activating the actual (unknown) trigger consisting of rare signals. Extensive research has been done on statistical test generation combining an ATPG (Automatic Test Pattern Generation) and an N-detect paradigm. In a paper by R. S. Chakraborty, F. Wolff, S. Paul, C. Papachristou, and S. Bhunia, entitled "MERO: A Statistical Approach for Hardware Trojan Detection," the authors proposed a tool named MERO to generate an N-detect test for logic testing. Algorithm 1 (below) shows the main steps of MERO. The goal of N-detect is to generate test vectors that will activate each rare signal N times. MERO achieves N-detect criteria by a constrained random approach. MERO starts with a large number of random test vectors, and flips each bit of random vectors to increase N-detect criteria. If a flip can increase the activation of rare signals which have not been activated by N times, the algorithm keeps the flipped pattern (reverses the flipping otherwise). MERO is shown to be effective in small designs (e.g., ISCAS benchmarks) with relatively easy-to-activate trigger conditions (with four rare signals and larger than a 0.1 rareness threshold). However, MERO is unsuitable for large designs (scalability problem) as well as hard-to-detect triggers.

Algorithm 1 MERO

```
 1: procedure MERO(R, N)
 2:    Tests = { }
 3:    simulate design with R random vectors
 4:    sort random vectors by the number of rare signal hits
 5:    for each vector u in random vectors do
 6:       for each bit u_i in u do
 7:          Flip u_i and simulate the design
 8:          if N-detect criteria does not improve then
 9:             reverse flipping
10:          end if
11:       end for
12:       Tests = Tests ∪ u, if u improves N-detect criteria
13:    end for
14: end procedure
```

The N-detect paradigm has been successful in both logic testing and side-channel analysis. An N-detect test set can activate each rare signal N times and is statistically effective for trigger activation given a "sufficiently" large N. The probability of hitting an exact trigger condition will significantly decrease when the signal itself is extremely rare or the trigger condition is composed of very rare signals. Although it is expected that increasing N can increase the chances of hitting trigger conditions, a larger N will significantly deteriorate the test generation performance and increase the required test length. MERO incorporates the N-detect idea concept with a deterministic flipping method, as shown in Algorithm 1, in which the quality of generated test vectors is highly dependent on the quality of the initial random vectors. MERO has the following two major problems that make it ineffective for activating hard-to-detect trigger conditions in large designs.

Figure 2:
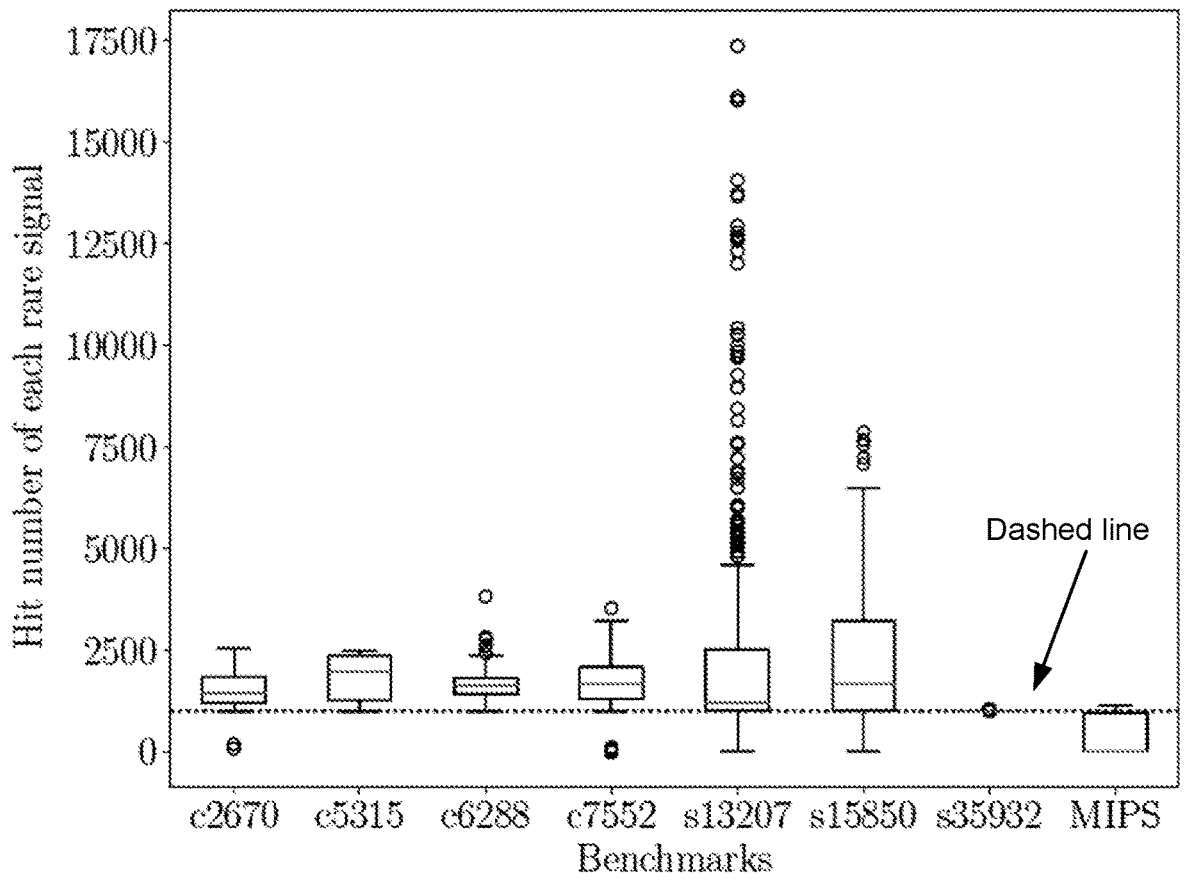
FIG. 2 is a diagram illustrating a number of times each rare signal is activated by test vectors generated by a Multiple Excitation of Rare Occurrence (MERO) test generation approach.

Although MERO claims to implement N-detect, the generated test vectors cannot guarantee that each rare signal is activated at least N times. With the same configuration (R=100K, N=1000) for the same ISCAS benchmarks and (R=1 M, N=1000) for MIPS processor from OpenCores, the number of times each rare signal is activated by MERO is examined, as shown in FIG. 2. The figure illustrates the number of times each rare signal is activated by the test vectors generated by MERO for ISCAS (IEEE International Symposium on Circuits and Systems) benchmarks and MIPS processor. Accordingly, the number of initial random vectors is 100K for ISCAS benchmarks and one million for MIPS processor. N is fixed to be 1000 for N-detect criteria (dashed line) such that extremely rare signals are almost never activated while not-so-rare signals are activated more than N times.

Figure 3:
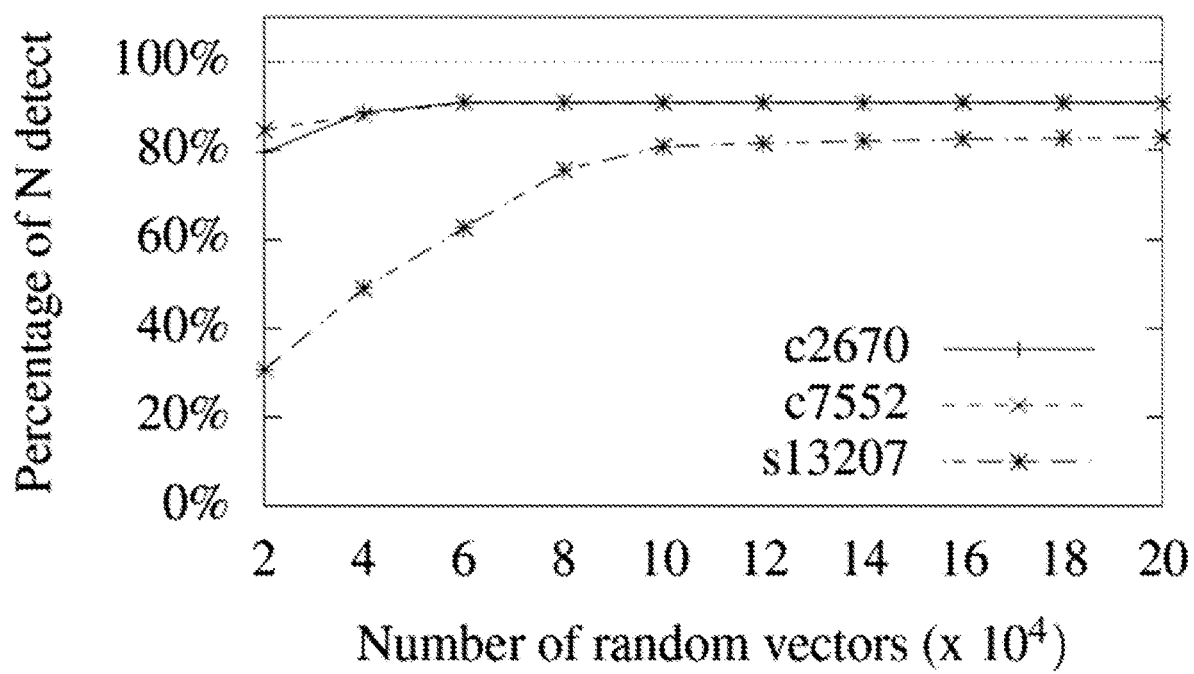
FIG. 3 is a diagram illustrating a percentage of rare signals that are activated more than 1000 times by MERO with the same configurations as FIG. 2.

There are some extremely rare signals (outliers below the dashed line) that are almost never activated in most benchmarks, while some signals (outliers above the dashed line) are activated more than N times. To ensure N-detect for all rare signals, the number of initial random vectors should be extremely large even for small benchmarks. To show how the number of random vectors affects N-detect in MERO, we set N=1000, and the number of random vectors are varied. The percentage of rare signals that are activated more than 1000 times is shown in FIG. 3. In particular, the figure illustrates the percentage of rare signals that are activated at least N times by MERO with the same configurations as FIG. 2. The percentage of N-detect rare signals grows rapidly when the number of random vectors is small, but very slowly beyond a specific number of random vectors.

As expected, the percentage of N-detect rare signals grows rapidly when the number of random vectors is small, but very slowly beyond a specific number. It is expected that for large designs, billions of random vectors are required to satisfy N=1000. MERO requires one simulation per bit flipping, where the total number of simulations would be in the order of billions or trillions, which makes this approach impractical for large designs.

MERO uses a vague notion of N being "sufficiently" large to ensure high trigger coverage. In fact, MERO simply selected N=1000 for all benchmarks in the paper by R. S. Chakraborty, F. Wolff, S. Paul, C. Papachristou, and S. Bhunia, entitled "MERO: A Statistical Approach for Hardware Trojan Detection." Despite the fact that all rare signals are activated at least 1000 times in the small benchmark c5315 (see FIG. 2), the trigger coverage is only 50.6%. In other words, N=1000 is not "sufficiently" large for such a small benchmark. For larger designs with more trigger points and lower rareness threshold, a larger N is required to reach even a reasonable coverage by MERO, which needs a drastically larger number of random tests to start with, as discussed above, making scalability issue even worse.

Given the poor trigger coverage and scalability problem of N-detect and MERO, new paradigms are needed to solve the trigger activation problem. In accordance with embodiments of the present disclosure, the trigger activation problem can be solved by mapping it to the problem of covering maximal cliques in a graph. One aim is to activate extremely rare trigger conditions that can be covert during traditional validation. As such, it is believed that this is the first attempt to map the trigger activation problem to a maximal clique cover problem. The present disclosure provides proof that the test vectors generated by covering maximal cliques are complete and compact considering trigger coverage and test length. Additionally, efficient and scalable test generation algorithms, referred herein as Trigger Activation by Repeated MAximal Clique sampling (TARMAC), are presented in the present disclosure. Experimental results demonstrate that TARMAC outperforms the state-of-the-art test generation techniques by several orders-of-magnitude for extremely rare-to-activate trigger conditions in large designs.

Given a group of vertices some of which have edges in between them, a maximal clique is the largest set of vertices in which each point is directly connected to every other vertex in the set. As proved by Moon and Moser in a paper entitled "On Cliques in Graphs," the number of maximal cliques is $O(3^{n/3})$ for N vertices. Therefore, the effort of listing all maximal cliques is exponential to the number of vertices. Many efficient and parallel approaches exist in practice.

Bron-Kerbosch algorithm is a widely used approach to list all maximal cliques in a graph. It is a recursive procedure that keeps track of three disjoint sets R, P, and X, representing constructed cliques, candidate vertices, and excluded vertices, respectively. The existence of X ensures that maximal cliques are not repeated. Each recursive call adds one vertex from P to R and reports a maximal clique when P and X are both empty. The worst-case running time matches the largest number of maximal cliques in the Moon and Moser paper. In various embodiments of the present disclosure, maximal cliques are utilized to solve the trigger activation problem.

Figure 4:
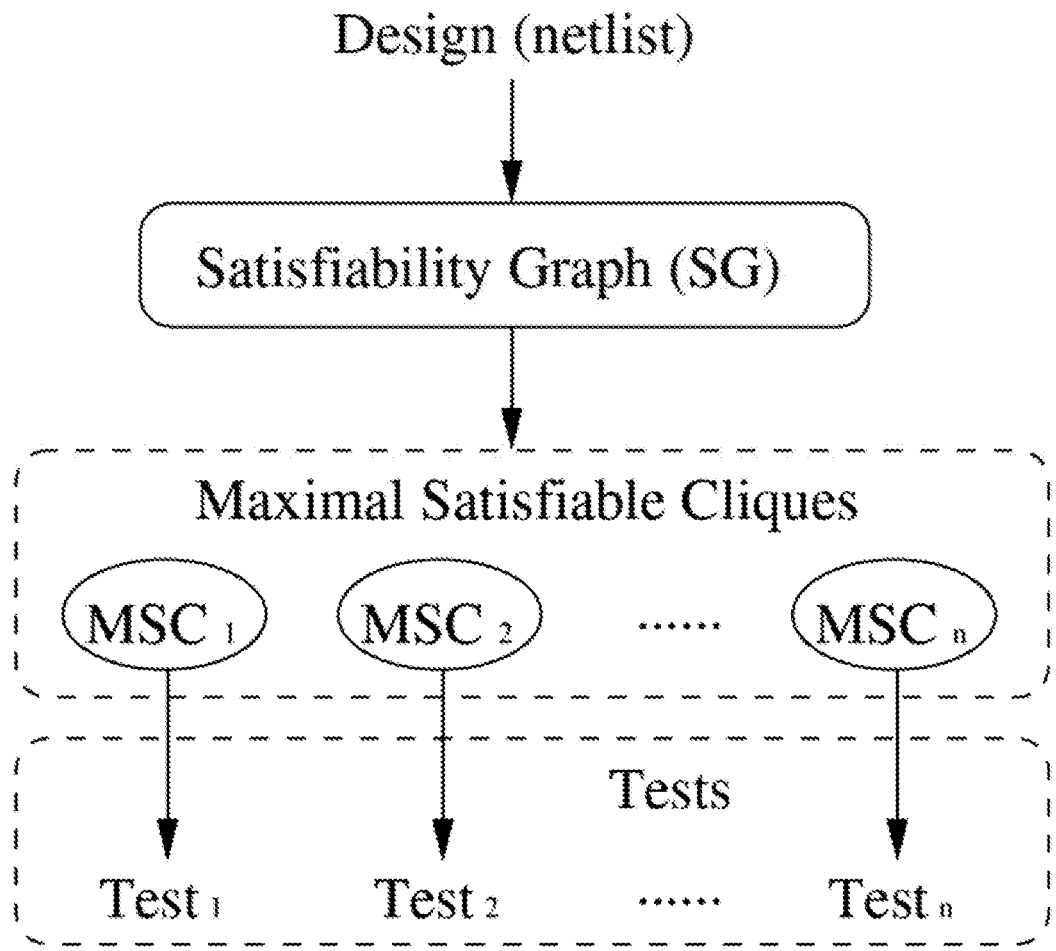
FIG. 4 is a diagram showing an exemplary process for generating test vectors for analyzing circuitry of an integrated circuit for hardware Trojans in accordance with embodiments of the present disclosure.

Referring now to FIG. 4, an exemplary paradigm for solving the trigger activation problem by mapping it to a maximal clique cover problem is represented. An exemplary approach first constructs a satisfiability graph based on the design (e.g., gate-level netlist). Then, the approach finds maximal satisfiable cliques (MSCs) in the satisfiability graph and utilizes an SAT (satisfiability) solver routine or operation to generate one test for each maximal satisfiable clique. Without any loss of generality, a gate-level implementation of the benchmarks is considered in the present disclosure. Exemplary algorithms, in accordance with the present disclosure, transform the gate-level implementation to design a graph and satisfiability graph using a rareness threshold as defined below. Exemplary definitions of various terminology is also provided below.

A rare signal is a signal which satisfies a specific value ('0' or '1') with a low probability that is below a given threshold (referred to as rareness threshold). The specific value is called its rare value. Let's consider the design in FIG. 1. In order to determine the rare signals and their rare values, the design is simulated using a large number of random test vectors. Next, the number of times each signal gets '0' or '1' is recorded. For example, the signal A gets '0' value less than 30% of time during simulation. In this case, signal A would be treated as a rare signal with rare value '0' if the rareness threshold is 0.3.

A Design Graph ($\mathcal{DG}$) is a graph level representation of a circuit design (e.g., gate-level netlist), where each signal is a node (vertex) and each edge between two nodes represents their connectivity (via a gate) in the implementation. Each signal contains two values: a logical expression (le) and a rare value (rv). For example, the construction of a design graph for the example in FIG. 1 is as follows. The number of vertices in the design graph would be the same as the number of signals in the circuit design. The number of edges will depend on the connectivity. For example, there will be an edge between two vertices $x_5$ and D, since they are connected through a gate. However, there will be no edge between $x_1$ and D, since they are not directly connected through a gate. The rare value (rv) for each node represents the logic value which is least likely to happen. For example, vertex A gets '1' value more times compared to '0', therefore, the rare value for vertex A (A:rv) is 0. The logical expression (le) of each vertex would be the logic represented by the corresponding logic cone. For example, the logical expression of four of the vertices are as follows:

A.le=$x_1 \lor x_4$

B.le=$x_2 \land \neg x_3$

C.le=$\neg(x_3 \lor x_4)$

D.le=$\neg(x_3 \oplus x_4) \lor x_5$

A Satisfiability Graph ($SG$) contains a set of vertices representing rare signals (with their rare values) and their satisfiability connections, $SG=\{\mathcal{V}, \mathcal{E}\}$. If (u:le==u:rv)$\land$(v:le==v:rv) is satisfiable, then there exists an edge between u and v, i.e., u $\in \mathcal{E}$(v) and v $\in \mathcal{E}$(u).

Figure 5:
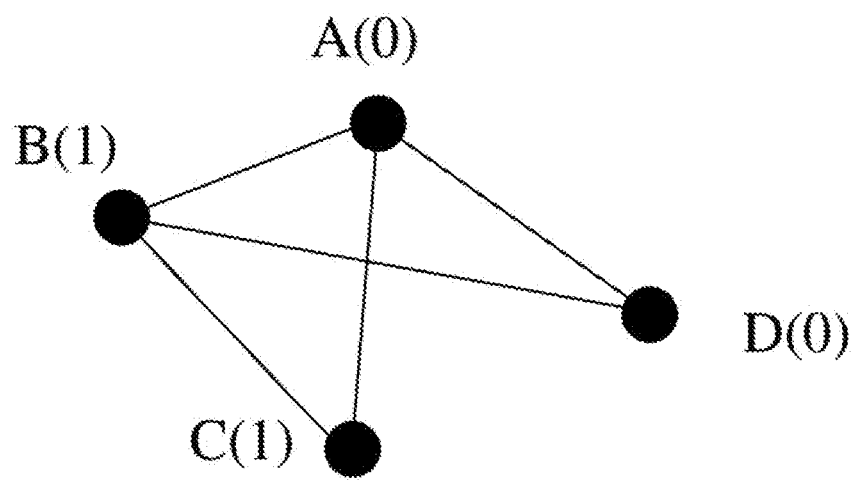
FIG. 5 is a diagram of an example satisfiability graph with four rare signals (A, B, C, D) from FIG. 1 in accordance with embodiments of the present disclosure.

Within the present disclosure, the terms vertices and rare signals are used interchangeably. Let us consider the example in FIG. 1 with four rare nodes (A, B, C, D). To construct the satisfiability graph for this example, their logical expressions described above are used and their connectivity is determined. To find out if there is an edge between any two vertices, input (test) patterns are checked to determine if any exists that satisfies both rare values. For example, the edge between A and B exists, since input pattern 01000 satisfies the condition $(x_1 \lor x_4 = 0) \land (x_2 \land \neg x_3 = 1)$. In other words, 01000 can activate both A and B at the same time with their respective rare values. On the other hand, there is no input pattern that satisfies $(\neg(x_3 \lor x_4) = 1) \land (\neg(x_3 \oplus x_4) \lor x_5 = 0)$, i.e., there is no edge between C and D. The constructed satisfiability graph is shown in FIG. 5 (rare values are shown inside parentheses). So far, only two vertices at a time have been considered. Algorithm 2 (below) generalizes this concept to find a satisfiability test for a set of vertices. It is easy to see that $SG$ is an undirected graph.

---

Algorithm 2 Satisfiability testing of a set of vertices

1:   procedure satisfiable (a set of vertices V)
2:     initialize SAT expression S = '1'
3:     for each vertex v ∈ V do
4:       S = S ∧ (v:/e == v: rv)
5:     end for
6:     return SATsolve(S)
7:   end procedure

---

A fundamental contribution of the present disclosure is to show that the trigger activation problem can be mapped to a clique cover problem. First, it can be shown that any valid trigger condition forms a clique in a satisfiability graph $SG$ by the following lemmas, theorems, and proofs.

Lemma 1. For any valid trigger condition with k rare signals $\{v_1, v_2, \ldots, v_k\}$, the vertices $\{v_1, v_2, \ldots, v_k\}$ form a k-clique in the satisfiability graph $SG$.

Lemma 1 Proof. Lemma 1 can be proven by contradiction. Assume that there is no edge between $v_i$ and $v_j$. By definition, condition $(v_i.le==v_i.rv) \land (v_j:le==v_j.rv)$ is not satisfiable. Therefore, there will be no test that can activate $v_i$ and $v_j$ together, invalidating the trigger condition. Since there is an edge between any pair of vertices, $\{v_1, v_2, \ldots, v_k\}$, form a k-clique in the satisfiability graph $SG$. Note that it is possible to have a clique in the satisfiability graph that does not represent a valid trigger condition. For example, consider the clique ABD in FIG. 5. There is no input pattern that satisfies the condition $(x_1 \lor x_4 = 0) \land (x_2 \land \neg x_3 = 1) \land (\neg(x_3 \oplus x_4) \lor x_5 = 0)$, although there are edges between any two of the three vertices. In other words, ABD forms a clique in $SG$, but it does not represent a valid trigger condition. Clearly, an adversary will not use it as a Trojan trigger (if s/he does use it, it is useless since it cannot be triggered). For the ease of illustration, a satisfiable clique is defined in Definition 1 (below). The relationship between satisfiable cliques and valid trigger conditions is shown by the following theorems/lemmas and proofs.

Definition 1: A satisfiable clique $SC$ is a clique in a satisfiability graph $SG$, where all the vertices of $SC$ can be activated by the same input vector.

Lemma 2. Any valid trigger condition can be represented as a satisfiable clique $SC$ in satisfiability graph $SG$.

Lemma 2 Proof. Lemma 1 proves that any valid trigger condition forms a clique in $SG$. Validity of this trigger condition ensures that all vertices can be activated by the same input vector. By Definition 1, this clique is a satisfiable clique.

Lemma 3. Any satisfiable clique $SC$ in satisfiability graph $SG$ represents a valid trigger condition.

Lemma 3 Proof. For any satisfiable clique, all its vertices can be activated by a test vector by Definition 1. Thus, these vertices represents a valid trigger condition. Next, the mapping from the set of valid trigger conditions to the set of satisfiable cliques is explored. Theorem 1 points out a new way to solve trigger activation problem, i.e., finding test vectors to cover satisfiable cliques in a satisfiability graph.

Theorem 1. The mapping between the set of valid trigger conditions and the set of satisfiable cliques is a bijection.

Theorem 1 Proof. As different trigger conditions contain at least one different rare signal, the corresponding satisfiable clique contains at least one different vertex. Hence, no two valid trigger conditions map to the same satisfiable clique, i.e., the mapping from the set of valid trigger conditions to the set of satisfiable cliques is an injection from Lemma 2. Similarly, one can conclude that the mapping from the set of satisfiable cliques to the set of valid trigger conditions is an injection from Lemma 3. Therefore, a one-to-one mapping between these two sets exists.

Lemma 4. If one test vector can satisfy a satisfiable clique, all its subgraphs can be satisfied by the same test vector.

Lemma Proof 4. Let R be a subgraph of a satisfiable clique $SC$. By Definition 1, all vertices in $SC$ can be satisfied by the same test vector t. All vertices of R are inherently satisfiable by t since the vertices of R are a subset of the vertices of $SC$.

Lemma 5. A subgraph of a satisfiable clique is also a satisfiable clique.

Lemma 5 Proof. For any satisfiable clique $SC$, its subgraph R is a clique as $SC$ is a clique. By Lemma 4, R is satisfiable. By definition, R is a satisfiable clique.

Therefore, if a test vector is found that can satisfy a clique, it is not necessary to generate any more tests for all the trigger conditions represented by its subgraphs. Clearly, the most profitable test vector is the one that can satisfy the largest clique. Similar to cliques in graph theory, a maximal satisfiable clique is defined in Definition 2 (below).

Definition 2. A maximal satisfiable clique (MSC) is a satisfiable clique to which no more vertices can be added.

Let $\{\mathcal{MSC}_i\}$ represent the complete set of maximal satisfiable cliques. For example, $\mathcal{MSC}_1$=ABC, $\mathcal{MSC}_2$=AD, $\mathcal{MSC}_3$=BD represent the maximal satisfiable cliques in FIG. 5. Next, it is proven the set of test vectors that activate all elements in $\{\mathcal{MSC}_i\}$ is optimal in activating all possible trigger conditions in the circuit design.

Theorem 2. Let $t_i$ be an input pattern that activates the corresponding maximal satisfiable clique $\mathcal{MSC}_i$. Then, the test set T=$\{t_i\}$ is complete and compact, i.e., it is the shortest test set that can activate all valid trigger conditions.

Theorem 2 Proof. The completeness of the test set is proven first. For any valid trigger condition, it forms a satisfiable clique $SC$ by Theorem 1. By definition of maximal satisfiable cliques, there exists some maximal satisfiable clique $\mathcal{MSC}_i$ such that $SC \subset \mathcal{MSC}_i$. As $t_i \in$ T satisfies $\mathcal{MSC}_i$, it inherently satisfies satisfiable clique $SC$ by Lemma 4. As T can satisfy all elements in $\{MSC_i\}$, it can satisfy any valid trigger condition.

Once it is proven that the test set is compact, it is easy to see that any two maximal satisfiable cliques can never be activated by the same test vector; otherwise, they form a larger satisfiable clique which contradicts the definition of maximal satisfiable clique in Definition 2. As any maximal satisfiable clique represents a valid trigger condition by Lemma 3, a test set that can activate all these trigger conditions need at least $|\{\mathcal{MSC}_i\}|(=|T|)$ test vectors. Hence, no test set that satisfies all trigger conditions can be shorter than T.

As a result, the problem of test generation for trigger activation can be reduced and mapped to the problem of finding maximal satisfiable cliques and generate a directed test for them. Based on Theorem 2, the generated test vectors are the optimal solution considering both trigger coverage and test length. For the example in FIG. 5, we need exactly three tests—$t_1$ (01000), $t_2$ (01100), and $t_3$ (11010) to activate maximal satisfiability cliques ABC, AD, and BD, respectively.

To illustrate, the present disclosure presents exemplary test generation algorithms (e.g., Algorithm 3 and Algorithm 4 below) to generate test patterns by covering maximal satisfiability cliques (MSCs). Algorithm 3 is guaranteed to generate the complete test set (covers all the trigger conditions) but is not scalable, since the algorithm requires an enumeration of a potentially exponential number of MSCs. In addition, the algorithm has the bottleneck of construction of the full satisfiability graph. Accordingly, Algorithm 3 is suitable when a small number of rare signals are in a design. To address the scalability issue, Algorithm 4 replaces the enumeration problem by randomly sampling MSCs and performs lazy construction of the satisfiability graph. Algorithm 4 is significantly faster and effective, but cannot guarantee completeness. A more detailed description of these exemplary algorithms are presented next.

Based on Theorem 2, a first straightforward test generation algorithm based on clique enumeration is presented. Main steps of this approach are shown in Algorithm 3 ("Test Generation by Clique Enumeration") (below). The procedure of Test Generation first parses and constructs the design graph ($\mathcal{DG}$) from the gate-level netlist, and computes all the logic expressions. Then, the vertices of satisfiability graph ($S\mathcal{G}$) are initialized from rare signals and the edges are built after testing satisfiability of any two vertices (ConstructSatisfiabilityGraph). Next, a Bron-Kerbosch algorithm is applied to find all maximal cliques in $S\mathcal{G}$. For every clique $C$ found in line 4 (below), all maximal satisfiable cliques inside $C$ are needed to be found. Finally, test vectors are generated for each maximal satisfiable clique.

---

Algorithm 3 Test Generation by Clique Enumeration

1: procedure TestGeneration(circuit netlist CN, a set of rare signals RS, maxVectorNumber VN)
2:    $\mathcal{DG}$ = ConstructDesignGraph (CN)
3:    $S\mathcal{G}$ = ConstructSatisfiabilityGraph($\mathcal{DG}$, RS)
4:    Clique set $CS$ = Bron-Kerbosch($S\mathcal{G}$)
5:    for each clique $C$ in $CS$ do
6:        Find all maximal satisfiable cliques in $C$ and use SAT solver to generate a test vector $t_i$ for it
7:    end for
8:    return Tests = $\{t_i\}$
9: end procedure
10: procedure ConstructSatisfiabilityGraph($\mathcal{DG}$, RS)
11:    $S\mathcal{G}.V$ = RS, $S\mathcal{G}.\mathcal{E}(u)$ = { }
12:    for u, v $\in S\mathcal{G}.\mathcal{V}$ do
13:        if satisfiable($\{u, v\}$) then
14:            $S\mathcal{G}.\mathcal{E}(v) = S\mathcal{G}.\mathcal{E}(v) \cup \{u\}$
15:            $S\mathcal{G}.\mathcal{E}(u) = S\mathcal{G}.\mathcal{E}(u) \cup \{v\}$
16:        end if
17:    end for
18:    return $S\mathcal{G}$
19: end procedure

---

For any maximal satisfiable clique, it must be a subgraph of some maximal clique $C$ enumerated by Bron-Kerbosch. Line 6 ensures that the maximal satisfiable clique is found when we visit $C$. By Theorem 2, the generated test vectors are complete. This approach is effective in small designs but lacks the scalability due to the following two major bottlenecks.

First, the computational problem of finding all maximal cliques is NP-hard. Although Bron-Kerbosch algorithm is practical in finding all maximal cliques, it suffers from deep recursive function calls for large graphs with the worst running time $O(3^{n/3})$ [37], where n is the number of vertices. Second, finding all maximal satisfiable cliques inside a large clique (e.g., more than 20 vertices) is difficult. A brute force approach is needed to check the satisfiability of all different combinations. The running time is exponential to the size of the clique.

In addition to the exponential clique enumeration problem, Algorithm 3 also has the bottleneck of constructing the full satisfiability graph. When the number of vertices $|S\mathcal{G}.\mathcal{V}|$ is extremely large, checking if an edge exists between two vertices requires approximately $|S\mathcal{G}.\mathcal{V}|^2/2$ calls of the SAT solver, which can be prohibitive in terms of debug time. This process can be eliminated due to the following observations.

First, the SAT solver needs to be called for more than two vertices even with complete construction of the graph. Pairwise connections of more than two vertices do not imply the satisfiability of these vertices. Second, an edge between two vertices is a satisfiable clique with two vertices. The satisfiability checking could be postponed to the step of finding maximal satisfiable cliques. In theory, the satisfiability of any two vertices can be checked during the generation of tests with enough sampling.

To address both clique enumeration and satisfiability graph construction issues in Algorithm 3, an on-the-fly technique (TARMAC) is presented in Algorithm 4 (below) that utilizes lazy construction of the satisfiability graph and a random sampling of maximal satisfiable cliques. For each sampled maximal satisfiable clique, TARMAC generates one test vector for it. This randomization approach makes TARMAC scalable to large designs with the cost of completeness.

As shown in Algorithm 4, initially every vertex is connected to every other vertices in line 3. Whenever two vertices unsatisfiable are found (line 16), the edge between these two vertices is removed. Lazy construction benefits large designs by generating test vectors as soon as possible, with the cost of wasted SAT solver calls. If one looks at the example in FIG. 5, Algorithm 3 disconnects C and D at the very beginning, while Algorithm 4 constructs a fully connected graph initially. In the clique sampling process of Algorithm 4, there may exist some wasted checking, such as (msc={A, C}, v={D}) and (msc={B, D}, v={C}), until the algorithm finds out that C and D cannot be satisfied together when msc∪v={C, D}. The unsatisfiability of C and D contributes to multiple SAT solver calls in Algorithm 4. The probability of C and D being selected as the first two vertices is approximately $2/|SG.\mathcal{V}|^2$. Statistically, a full graph can be constructed after $|SG.\mathcal{V}|^2/2$ sampling.

Clique sampling is done by maintaining two sets of vertices: msc to keep track of vertices that are already found in a satisfiable clique, and P to represent candidate vertices that may potentially be added to msc. Initially, msc is empty and P contains all the vertices. A vertex v is first randomly selected and removed from candidate set P. If msc can be augmented by v, i.e., msc∪{v} is satisfiable, the algorithm puts v into msc and remove all vertices in P that are not in $SG.\mathcal{E}$ (v). It is easy to verify that msc represents a maximal satisfiable clique when P is empty. Parameter VN is used to control how many times maximal satisfiable cliques should be sampled, i.e., the number of generated test vectors.

---

Algorithm 4 Test Generation using Random Sampling and Lazy Construction (TARMAC)

---

1: procedure TestGeneration (circuit netlist CN, a set of rare signals RS, maxVectorNumber VN)
2:  $\mathcal{DG}$ = ConstructDesignGraph (CN)
3:  $SG.\mathcal{V}$ = RS, $SG.\mathcal{E}$(u) = $SG$.V \ {u}
4:  for i = 1 to VN do
5:      $t_i$ = CliqueSampling($SG$)
6:  end for
7:  return Tests = {$t_i$}
8: end procedure
9: procedure CliqueSampling($SG$)
10:     msc = { }, P = $SG.\mathcal{V}$
11:     while P is not empty do
12:         randomly pick and remove one vertex v from P
13:         if satisfiable(msc[fvg) then
14:             msc = msc ∪ {v}
15:             P = P ∩ $SG.\mathcal{E}$(v)

---

Algorithm 4 Test Generation using Random Sampling and Lazy Construction (TARMAC)

---

16:         else if msc contains only one vertices u then
17:             $SG.\mathcal{E}$(v) = $SG.\mathcal{E}$(v) \ {u}
18:             $SG.\mathcal{E}$(u) = $SG.\mathcal{E}$(u) \ {v}
19:         end if
20:     end while
21:     Use SAT solver to solve msc and return the test
22: end procedure

---

To show the effectiveness of TARMAC, a framework TARMAC is implemented in C++ and Z3 is chosen as the SMT solver. This framework parses gate-level Verilog files, constructs a satisfiability graph, and generates test vectors based on maximal satisfiability clique sampling, as shown in Algorithm 4.

Figure 6:
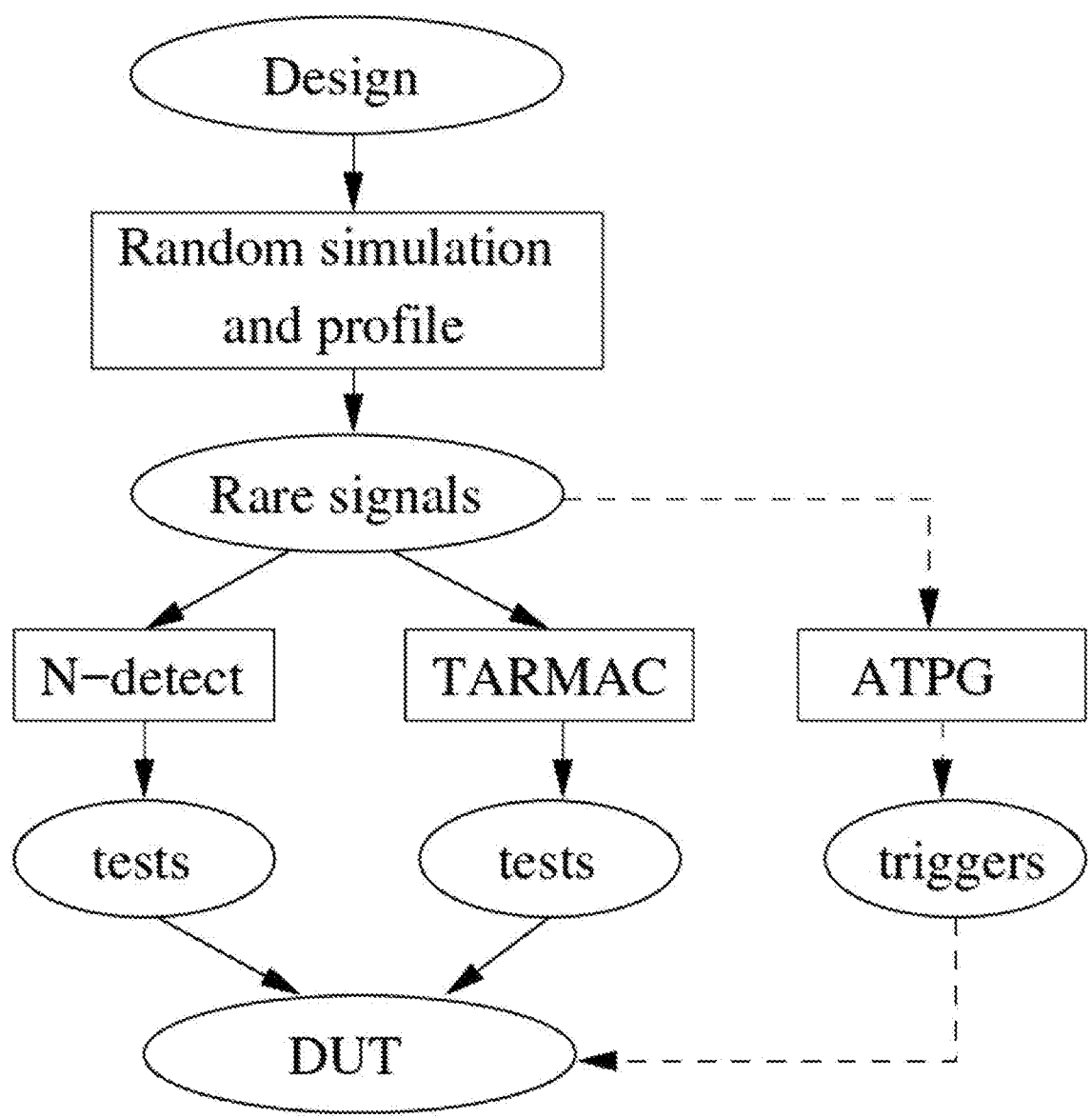
FIG. 6 is a diagram illustrating an experimental setup for evaluation of an exemplary test generation algorithm (TARMAC) compared to an N-detect approach (MERO) in accordance with embodiments of the present disclosure.

A variety of experiments is conducted on a machine with Intel Xeon E5-2698 CPU @2.20 GHz to evaluate the performance of TARMAC compared to random test vectors and MERO. In the present disclosure, the same benchmarks (ISCAS-85 and ISCAS-89) from the paper by R. S. Chakraborty, F. Wolff, S. Paul, C. Papachristou, and S. Bhunia, entitled "MERO: A Statistical Approach for Hardware Trojan Detection" are used to enable a fair comparison with the N-detect approach results from that paper. Large designs (memory controller from TrustHub and MIPS processor from OpenCores) are used to demonstrate the scalability of an exemplary approach. The experimental setup for evaluation of TARMAC compared to N-detect approach is shown in FIG. 6. Here, trigger conditions are randomly sampled and validated by ATPG tools. Each design under test (DUT) contains only one trigger condition. Test vectors from N-detect and TARMAC are applied to each DUT individually to collect trigger condition coverage information.

A number of random simulations (100K for ISCAS and one million for the other designs) on the design is first run or executed and the probability of each signal is computed. The rareness threshold is set to be 0.1 for ISCAS benchmarks and 0.005 for the other designs. For each benchmark, 1000 trigger conditions are randomly sampled and validated using ATPG. After sampling 1000 valid trigger conditions, each of them is individually integrated into the original design to construct a design under test (DUT). In other words, there are 1000 DUTs from each benchmark with one trigger condition for evaluation. In the meantime, the N-detect approach (MERO) and TARMAC (Algorithm 4) are applied to generate the test set. Finally, both test sets are applied to each DUT and the trigger condition coverage is collected. For all experiments, N=1000 is set for N-detect approaches.

Figure 7A:
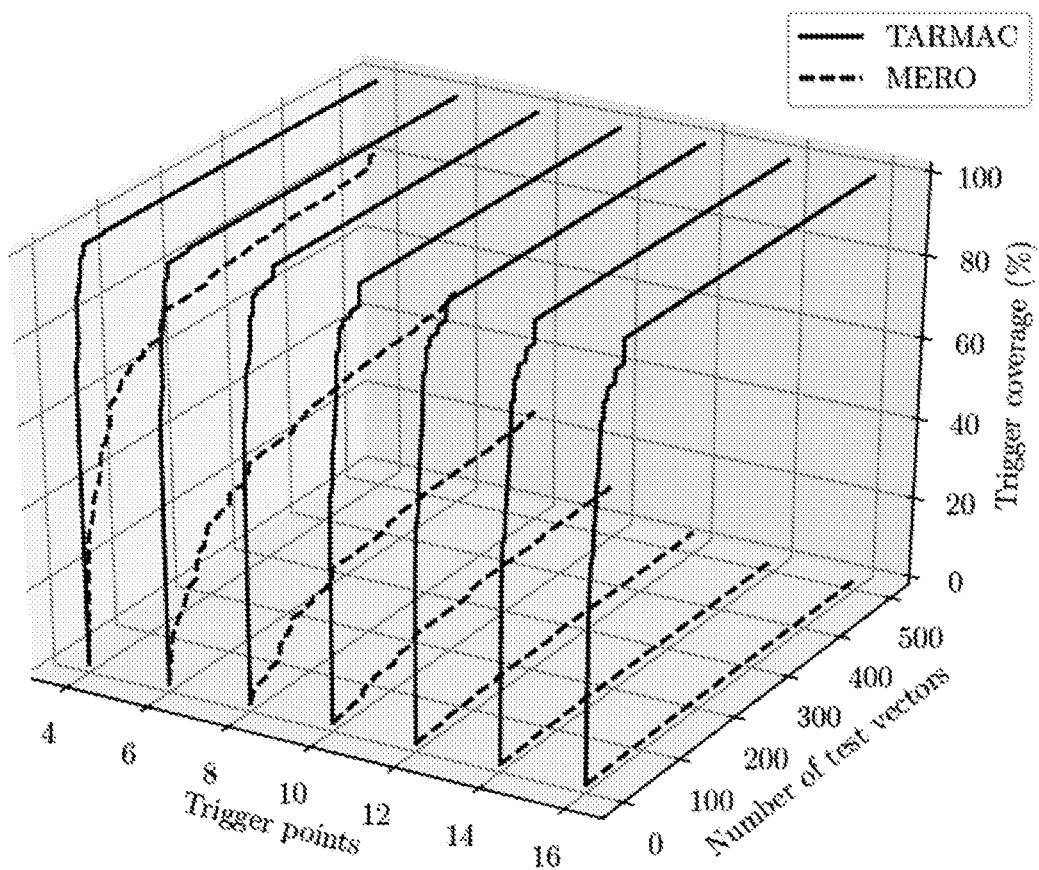
FIGS. 7A-7B are diagrams illustrating a trigger condition coverage of TARMAC and MERO on benchmark circuits c2670 and MIPS (Microprocessor without Interlocked Pipelined Stages) with respect to the number of test vectors given a number of trigger points.
Figure 7B:
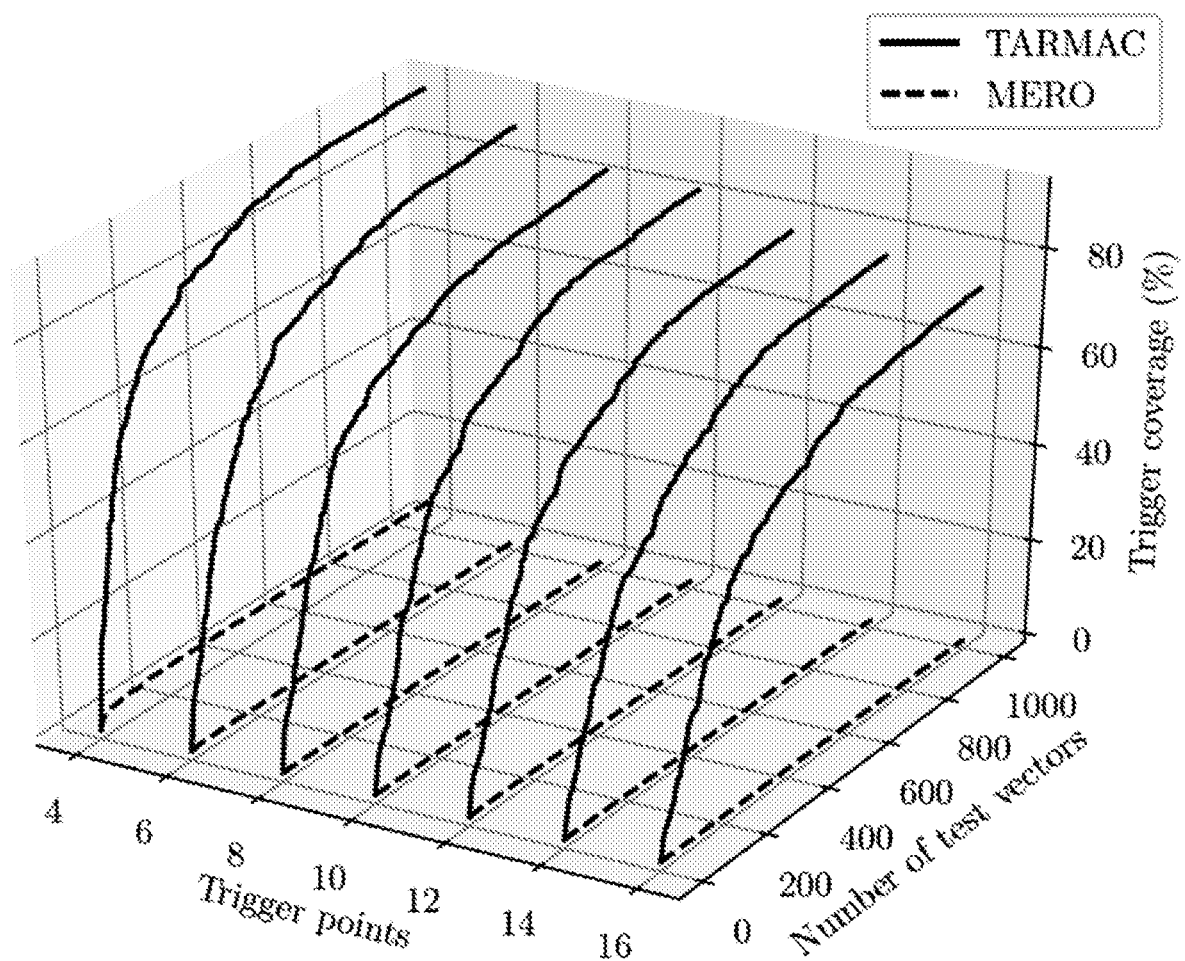

In one experiment, the effects of trigger points on the trigger coverage of both approaches are explored. For example, when a trigger condition has less trigger points (e.g., 4), it has higher probability to be activated by random simulation. On the other hand, a trigger condition with more rare signals is much harder to be activated. For example, the probability of activating a 16-trigger condition is less than $10^{-16}$ when these signals are independent and rareness threshold is 0.1. Both MERO and TARMAC on c2670 and MIPS are evaluated with various number of trigger points between 4 and 16. The results of TARMAC and MERO are shown in FIGS. 7A-7B.

Each line represents trigger condition coverage with respect to the number of test vectors applied to DUTs with a fixed number of trigger points. As the results suggest, the performance of MERO deteriorated sharply with increasing trigger points, while TARMAC maintained high coverage for both benchmarks. For a small number of trigger points (e.g., 4), MERO can achieve good coverage in c2670. However, its coverage for a large number of trigger points (e.g., 16) is extremely poor with less than 5% coverage. On the other hand, TARMAC can achieve 100% coverage with less than 100 test vectors even for 16-trigger conditions. As a 16-trigger condition is rarer than 4-trigger ones, TARMAC took more test vectors to achieve the same coverage in MIPS, as shown in FIG. 7B. Therefore, TARMAC is more resilient to the increasing number of trigger points and is good at activating extremely rare-to-activate trigger conditions. In the remaining experiments, the number of trigger points is fixed to be 8, since it is a common number of trigger points in TrustHub and it allows MERO to achieve a reasonable trigger condition coverage for comparison.

In another experiment, the trigger condition coverage of TARMAC on a subset of ISCAS benchmarks is compared to a random approach and MERO. To get a fair comparison of trigger coverage, the trigger coverage with the same number of test vectors is evaluated. It is noted that the length of MERO test vectors cannot be controlled arbitrarily, since it depends on the N-detect criteria and the number of initial random vectors R. Hence, MERO is first executed with (R=100,000, N=1000), as suggested in the paper by R. S. Chakraborty, F. Wolff, S. Paul, C. Papachristou, and S. Bhunia, entitled "MERO: A Statistical Approach for Hardware Trojan Detection." After MERO finished, TARMAC is run to generate the same number of test vectors as MERO for each benchmark. The trigger coverage comparison of TARMAC with random and MERO test vectors is shown in Table 1 (below). In particular, the table provides a comparison of TARMAC with a random simulation and with MERO for trigger activation coverage over 1000 randomly sampled 8-trigger conditions. The test length of TARMAC was the same as MERO.

formed MERO in all benchmarks with a 91.9% trigger coverage on average. With the same number of test vectors, TARMAC can cover the extremely hard-to-activate trigger conditions that are left after applying both random test vectors and MERO with significantly less effort.

It is interesting to find that all three approaches did a great job in covering all trigger conditions in s35932. One of the reasons is that a lot of rare signals in s35932 can be satisfied together. Another observation is that the quality of MERO is partially dependent on the quality of random test vectors. For example, with 18.9% and 100% trigger activation coverages from random test vectors for c6288 and s35932, respectively, test vectors from MERO can cover 76.6% and 100%. However, for benchmarks such as c7552 and s31207, test vectors of MERO can only achieve 5.6% and 1.9%, respectively, since random test vectors cannot cover any trigger conditions. The limited improvement from random test vectors to MERO is due to the simple flipping bits approach to search for good vectors in MERO.

To show the scalability of TARMAC, a similar experiment was performed on two large benchmarks for a memory controller (MEM) and MIPS processor. For these designs, the number of rare signals is too large (more than 4K) if a rareness threshold of 0.1 is continued to be used. With this amount of rare signals, MERO will take a long time to try to flip lots of random test vectors such that each rare signal is satisfied at least 1,000 times. In order to allow MERO to finish in a reasonable time for comparison and evaluation, different rareness thresholds were tried such that the number of rare signals is in the order of 1,000. In the current experiment, the threshold was set to be 0.005, and the corresponding number of rare signals was 1306 in MEM and 906 in MIPS, after 1 million random simulations. Similar to previous experiments, 1000 trigger conditions were randomly sampled from these rare signals with 8 trigger points.

The results are shown in the last two rows of Table 1. Since each trigger condition contains 8 rare signals with a rareness threshold of 0.005, the probability of trigger con-

TABLE 1

| bench | Random | | MERO | | | TARMAC | | | | |
| --- | --- | --- | --- | --- | --- | --- | --- | --- | --- | --- |
| | Test Length | Cov. (%) | Test Length | Cov. (%) | Time (s) | Test Length | Cov. (%) | Impro. / Random | Impro. / MERO | Time (s) |
| c2670 | 100K | 0.3 | 6820 | 38.2 | 1268 | 6820 | 100 | 333x | 2.6x | 257 |
| c5315 | 100K | 1.1 | 9232 | 50.6 | 4396 | 9232 | 98.8 | 89.8x | 1.9x | 682 |
| c6288 | 100K | 18.9 | 5044 | 76.6 | 596 | 5044 | 95.0 | 5.0x | 1.2x | 638 |
| c7552 | 100K | 0 | 14914 | 5.6 | 7871 | 14914 | 66.5 | ∞ | 11.9x | 2185 |
| s13207 | 100K | 0 | 44534 | 1.9 | 15047 | 44534 | 94.4 | ∞ | 49.7x | 5417 |
| s15850 | 100K | 0 | 39101 | 3 | 17000 | 39101 | 88.7 | ∞ | 29.6x | 11337 |
| s35932 | 100K | 100 | 4047 | 100 | 49616 | 4047 | 100 | 1x | 1x | 1947 |
| MEM | 1M | 0 | 28542 | 0 | 89747 | 28542 | 98.6 | ∞ | ∞ | 15753 |
| MIPS | 1M | 0 | 25042 | 0.2 | 273807 | 25042 | 95.6 | ∞ | 472x | 19458 |

From Table 1, one can see that TARMAC can achieve a huge trigger coverage improvement over a random test vector, and up to 49 times improvement over MERO with only around a quarter of time to generate the same number of test vectors in the ISCAS benchmarks. For most benchmarks, TARMAC covered over 90% of the trigger conditions, while random and MERO test vectors missed most of them. In small benchmarks, such as c2670, c5315, and c6288, MERO outperformed random test vectors and achieved reasonable trigger condition coverage. However, in large benchmarks such as c7552, s13207, and s15850, the performance of MERO is very poor, with less than 6% trigger coverage. TARMAC, on the other hand, outperditions could be less than $10^{-18}$. It is expected that 1 million random simulations could not achieve good coverage. The test vectors generated by MERO also achieved poor coverage, 0% in memory controller, and 0.2% in MIPS. On the other hand, TARMAC is able to cover a majority of the trigger conditions efficiently. For example, TARMAC covered 95.6% of trigger conditions in MIPS using the same amount of test vectors as MERO, but finished test generation in 6 hours. Note that the average test generation of TARMAC for one test vector is less than one second. This demonstrates that an exemplary implementation of TARMAC is scalable for large designs, while MERO is not suitable.

To compare the compactness and efficiency of TARMAC with MERO, TARMAC was terminated when it just surpassed the same trigger coverage as MERO. For this experiment, the benchmarks s35932 that MERO achieved full coverage are omitted, because 100% coverage can be achieved with much fewer test vectors, but test length is not a configurable parameter in MERO. Thus, it would be an unfair comparison if the test length of TARMAC was compared to the number in Table 1. The results of the remaining benchmarks are shown in Table 2 (below). Here, the table provides a comparison of TARMAC with random simulation and with MERO for trigger activation coverage over 1000 randomly sampled 8-trigger conditions. TARMAC is terminated when it just surpassed the same trigger coverage as MERO.

TABLE 2

| | MERO | | | TARMAC | | | | |
|---|---|---|---|---|---|---|---|---|
| bench | Test Length | Cov. (%) | Time (s) | Test Length | Reduction | Cov. (%) | Time (s) | Improvement |
| c2670 | 6820 | 38.2 | 1268 | 1 | 6820x | 51.4 | 0.05 | 25360x |
| c5315 | 9232 | 50.6 | 4396 | 217 | 42.5x | 50.6 | 19.1 | 230x |
| c6288 | 5044 | 76.6 | 596 | 284 | 17.8x | 76.6 | 34.8 | 17x |
| c7552 | 14914 | 5.6 | 7871 | 175 | 85.2x | 5.6 | 31.2 | 252x |
| s13207 | 44534 | 1.9 | 15047 | 5 | 8907x | 2.6 | 0.8 | 18809x |
| s15850 | 39101 | 3 | 17000 | 13 | 3008x | 3.3 | 4.3 | 3953x |
| MEM | 28542 | 0 | 89747 | 1 | 28542x | 1.9 | 1.1 | 81588x |
| MIPS | 25042 | 0.2 | 273807 | 1 | 25042x | 0.8 | 1.8 | 152115x |
| Average | 21653 | 22.0 | 51216 | 87 | 249x | 24.1 | 11.6 | 4415x |

Since one test vector in TARMAC can outperform the trigger coverage of MERO for c2670, MEM, and MIPS, the test generation time of TARMAC is reported as the time to generate one test vector in these benchmarks regardless of the trigger coverage. In all the other benchmarks, the trigger coverage difference is minimal. Table 2 suggests that test vectors generated by TARMAC are several orders-of-magnitude more compact than MERO. For ISCAS benchmarks, the average reduction of test vectors is in the order of hundreds to achieve same coverage. The compactness gap becomes larger when the size of design grows. For example, while most of the reductions in small benchmarks (combinational circuits) are within 100 times, the reductions in sequential benchmarks grows to the order of thousands. In MEM and MIPS, the reduction even goes beyond 25 thousands. The improvement in test generation time follows the same trend as test length reduction. For example, while most of the time improvements in small benchmarks are within the order of hundreds, the improvements in sequential benchmarks grows to the order of thousands, even ten thousands. Finally, the improvement in MIPS processor even goes beyond 152 thousands. From the perspective of a debug engineer, efficiency of a test generation approach consists of two aspects.

The first one is test generation time. From Table 2, one can see that the improvements of test generation time over MERO are several orders of magnitude. The other one is test length, as it decides how many simulations or emulations are needed, which dominates debug time. As a result, a compact test set can lead to significant reduction in overall validation effort. Combining both improvements of test generation and reduction of test length as shown in Table 2, the efficiency of TARMAC is several orders of magnitude better than MERO.

For better illustration of trigger coverage, all benchmarks were run long enough, and the trigger coverage was plotted with respect to the number of test vectors in FIGS. 8A-8J. The figures shows that TARMAC can achieve full coverage using a small number of test vectors in a majority of benchmarks, while MERO and random test vectors can cover only a small fraction of trigger conditions with the same number of test vectors.

In the figures, the x-axis represents the number of tests applied to DUTs, and the y-axis represents the percentage of activated trigger conditions. The efficiency in trigger coverage is the gradient of trigger coverage curves. In most of the figures, TARMAC has much steeper slopes than MERO and the curves of random approach are almost flat. The results demonstrate that TARMAC can cover more trigger conditions faster (with significantly less test vectors) than MERO for most of the benchmarks. For example, with 200 test vectors in c2670, TARMAC already activated all the trigger conditions, while MERO only achieved 20% coverage.

These figures reveal that each vector in TARMAC is able to activate more potential trigger conditions than MERO. As stated in Lemma 4, each test vector can cover all the subgraphs of a satisfiable clique. Hence, if one test vector can activate more rare signals, it covers a larger clique and is likely to activate more potential trigger conditions. Therefore, the quality of a test vector is defined as the number of rare signals that it can cover (activate). To validate whether the quality of a test vector is the reason for different trigger coverage efficiency, the number of rare signals satisfying their rare values (rare signal hits, for short) for each test vector is counted.

Figure 8A:
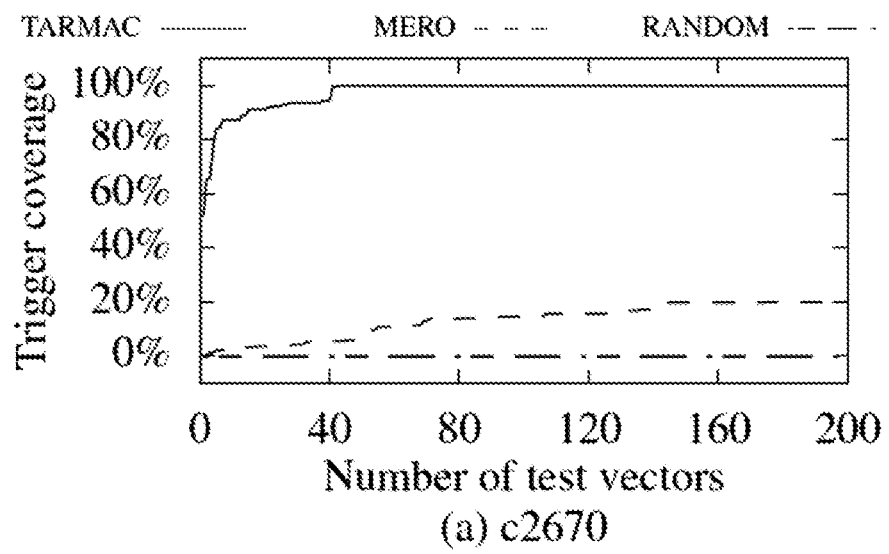
FIGS. 8A-8J are diagrams illustrating a trigger condition coverage of TARMAC, MERO, and random test vectors for various benchmark circuits.
Figure 8B:
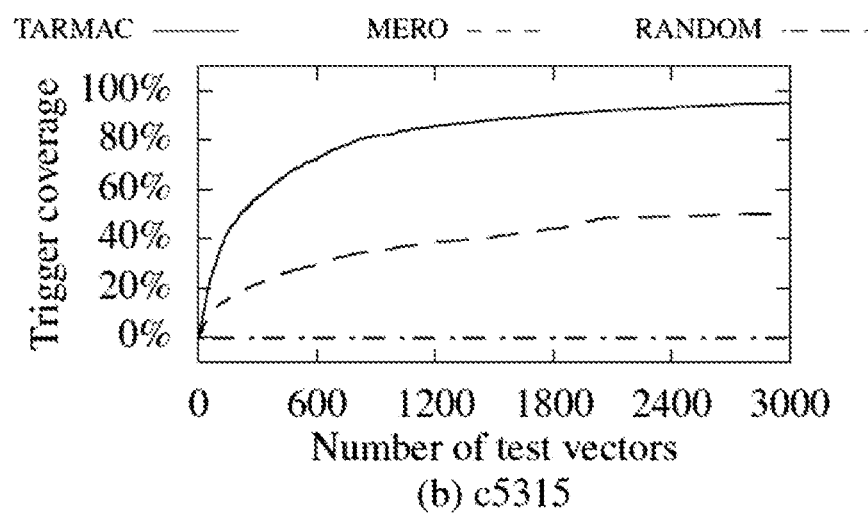
Figure 8C:
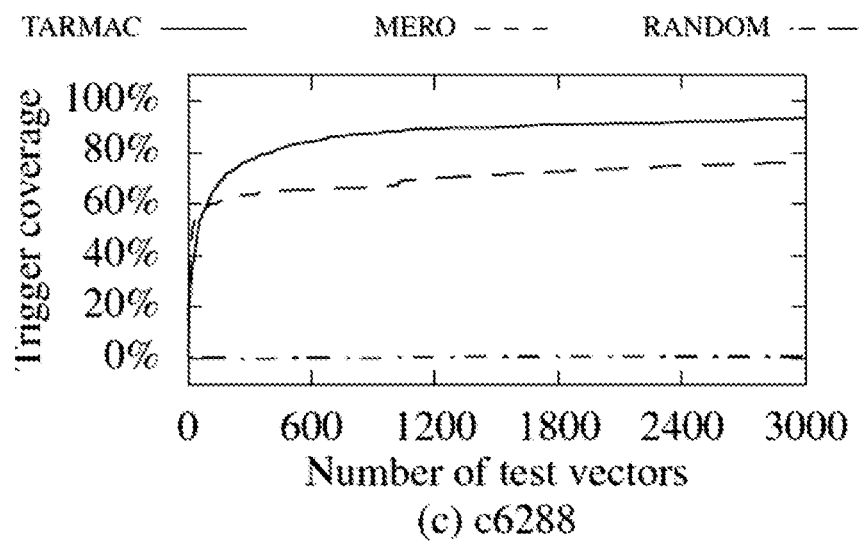
Figure 8D:
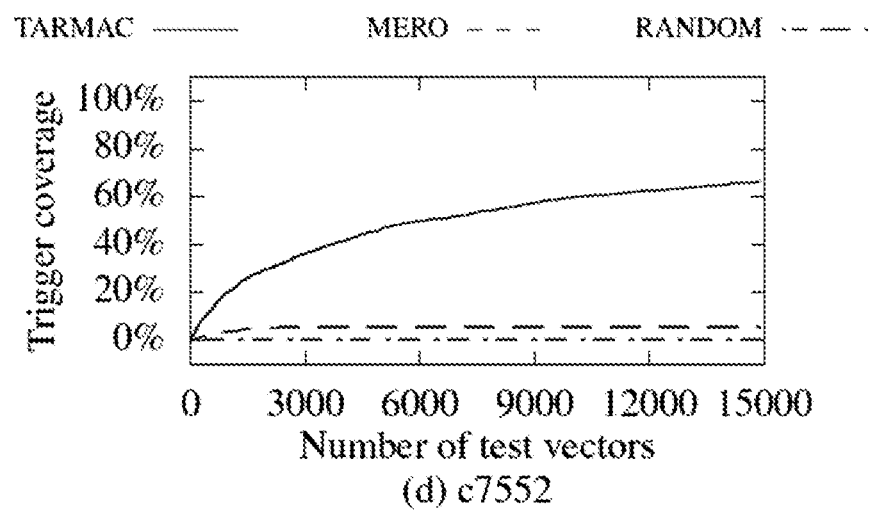
Figure 8E:
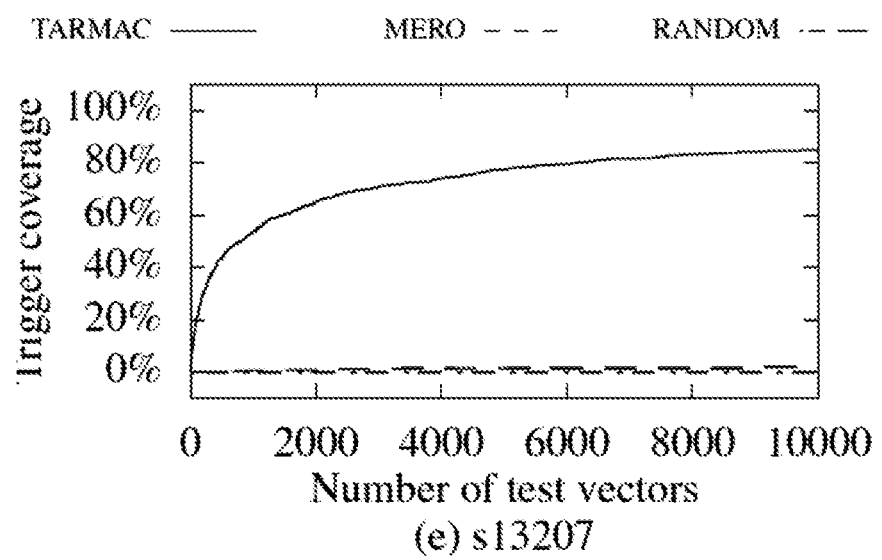
Figure 8F:
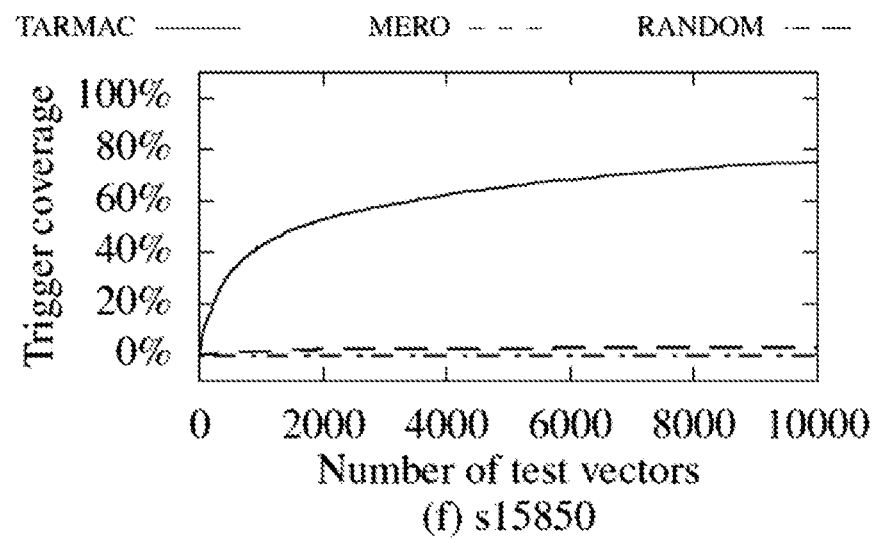
Figure 8G:
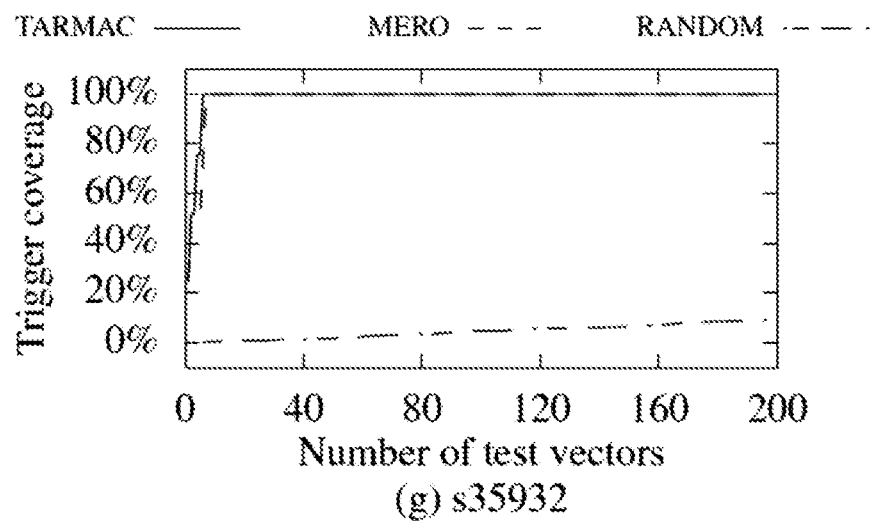
Figure 8H:
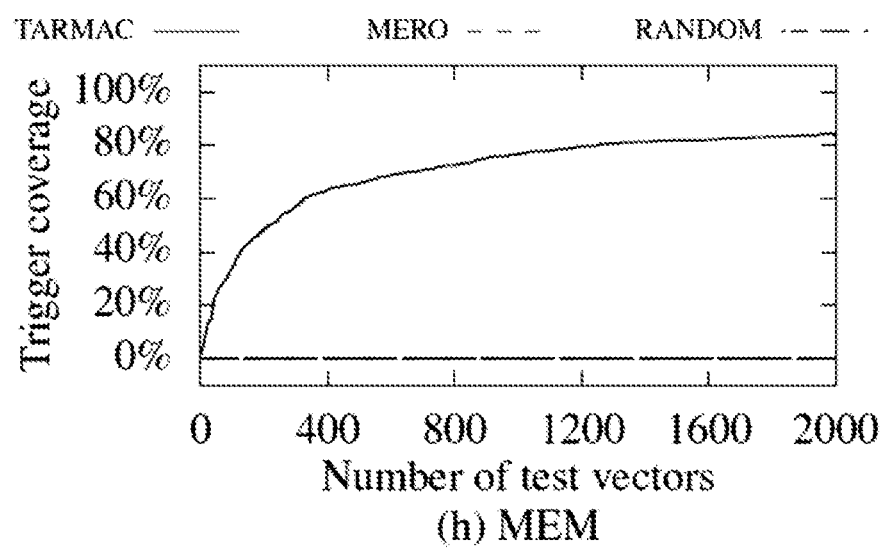
Figure 8I:
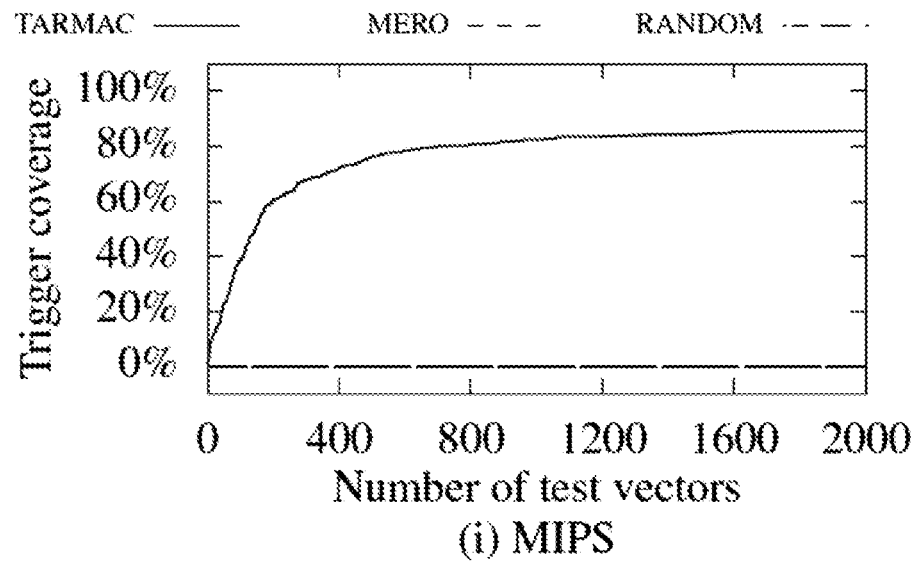
Figure 8J:
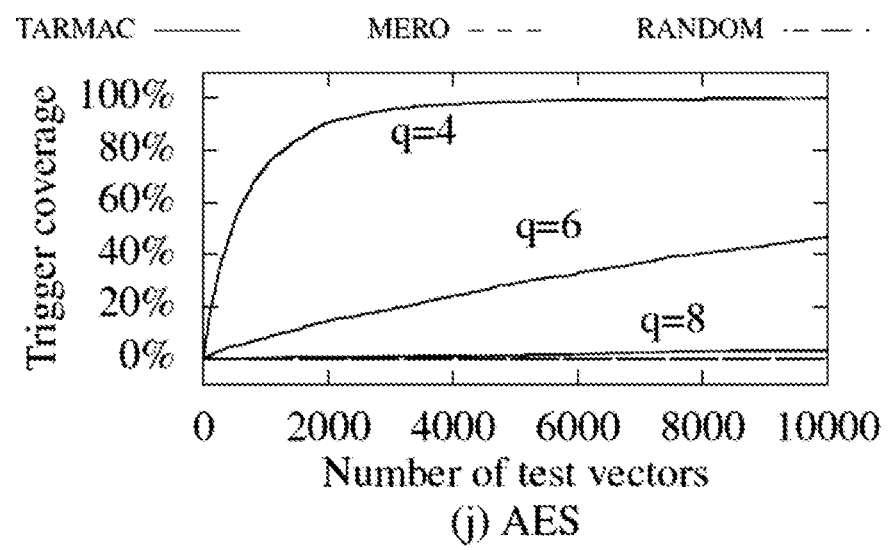
Figure 9A:
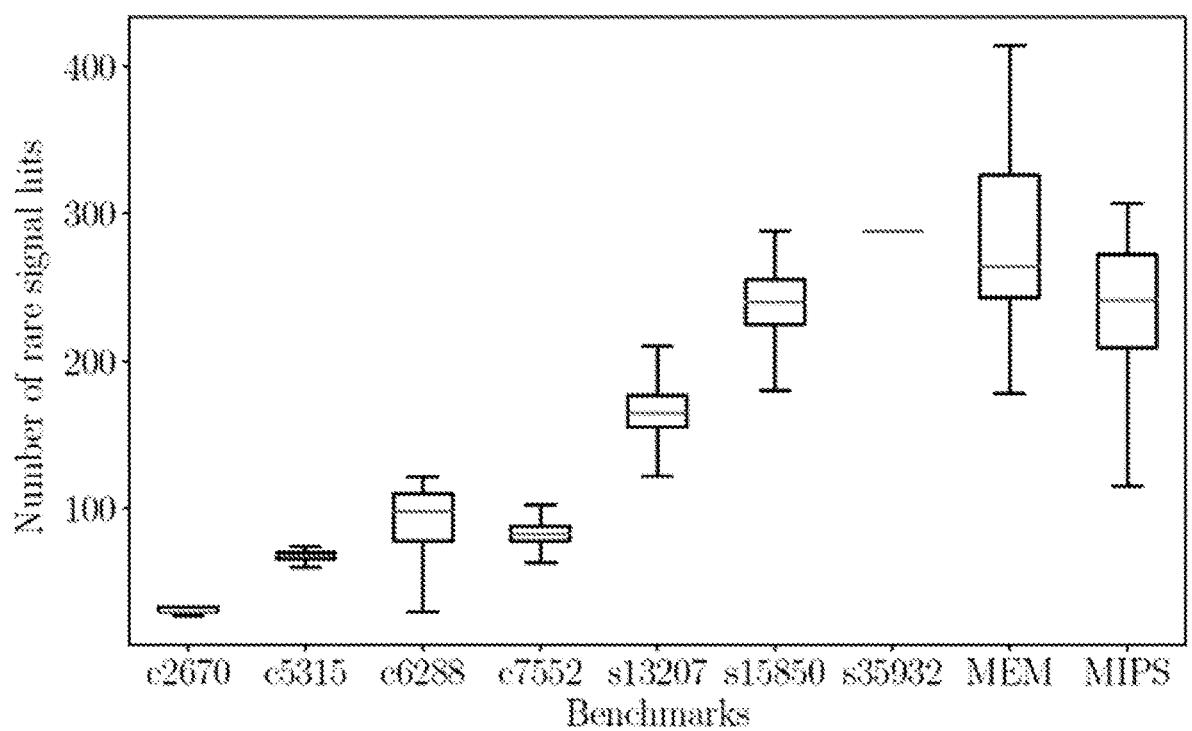
FIGS. 9A-9B are diagrams illustrating a distribution of rare signal hits by each test vector for TARMAC and MERO test generation algorithms in accordance with embodiments of the present disclosure.
Figure 9B:
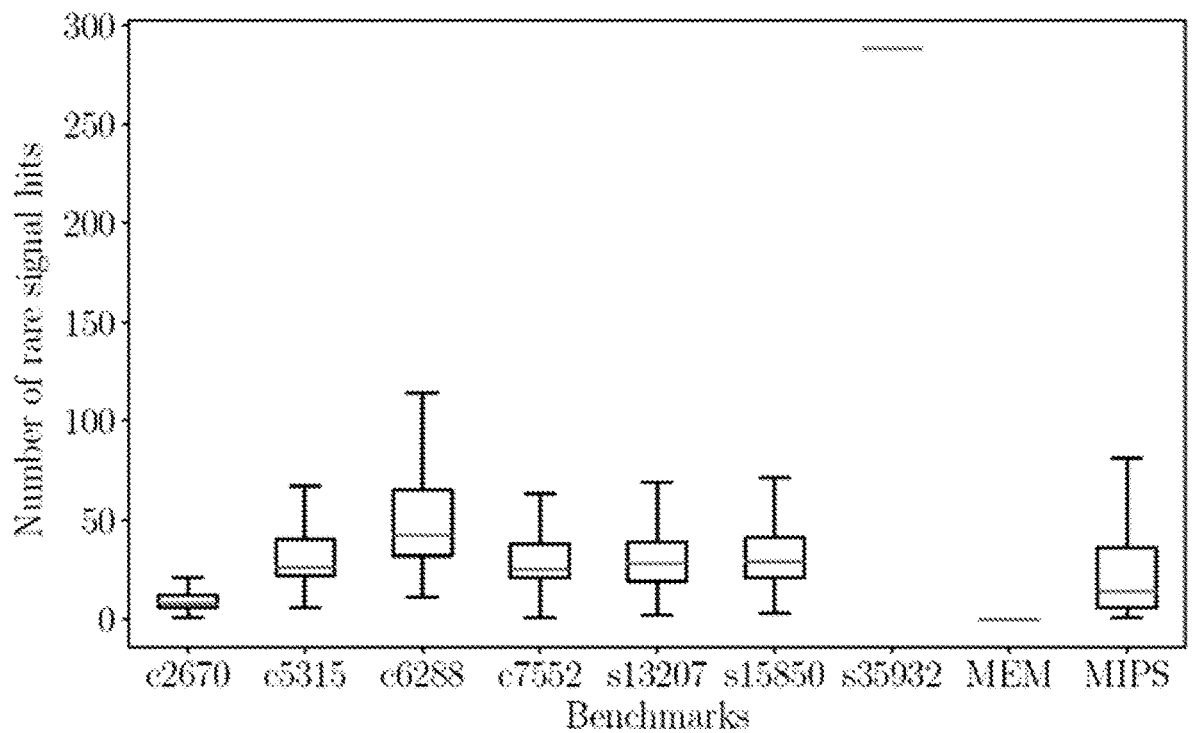

FIGS. 9A-9B shows the distribution of rare signal hits by each test vector. The results show that the numbers of rare signal hits are significantly larger in an exemplary implementation of TARMAC (except for the comparable numbers in c6288 and s35932), which is consistent with observations in FIGS. 8A-8J considering the coverage of trigger conditions. From Algorithm 4, the number of rare signal hits is the same as the size of each sampled maximal satisfiable clique in TARMAC. While in MERO, the number of rare signal hits is the best number of hits after one round of bit flipping from a random test vector. Clearly, the rare signal hits from MERO should always be statistically lower than TARMAC as the rare signal hits in TARMAC are optimal. Moreover, the quality of test vectors in MERO is not guaranteed, since it partially depends on the initial random vectors. As a result, MERO has low rare signal hits (normally less than 50), which is significantly smaller than rare signal hits in TARMAC.

As discussed above, the present disclosure introduces various algorithms for test generation, such as those involving clique enumeration (e.g., Algorithm 3) or random clique sampling with lazy construction (TARMAC) (e.g., Algorithm 4). Random clique sampling cannot guarantee to find all maximal satisfiable cliques as compared to clique enumeration. Random clique sampling is still useful, however, as demonstrated by studying AES (Advanced Encryption Standard) and MIPS benchmarks in the following discussion.

To begin, 100 rarest signals were selected as candidates to construct trigger conditions instead of specifying a threshold in AES. Then, TARMAC was executed with these 100 rare signals. Finally, the performance of the generated results with 4, 6, and 8 trigger points were evaluated for TARMAC, and the performance of one million random vectors and MERO was evaluated. As expected, both of the random simulation and MERO approaches cannot cover any trigger condition in any of the configurations. Therefore, TARMAC is not compared with random simulation and MERO approaches, in the discussion below.

FIG. 8J shows the results of TARMAC on AES with 4, 6, and 8 triggers. It is interesting to note that the trigger coverage deteriorated quickly, which is different from the MIPS processor shown in FIG. 7B. Careful analysis of the number of rare signal hits by each test vector reveals that the main difference lies in the size of the maximal satisfiable clique.

Figure 10A:
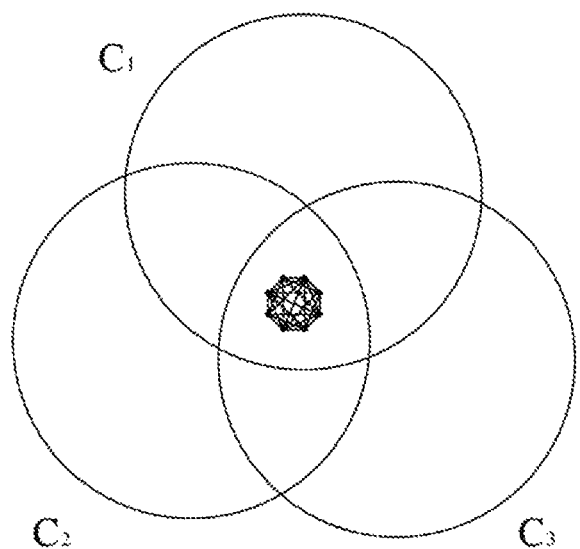
FIGS. 10A-10B are diagrams showing a relative size of trigger conditions compared to maximal SAT (satisfiability) cliques for MIPS and AES (Advanced Encryption Standard) benchmark circuits.
Figure 10B:
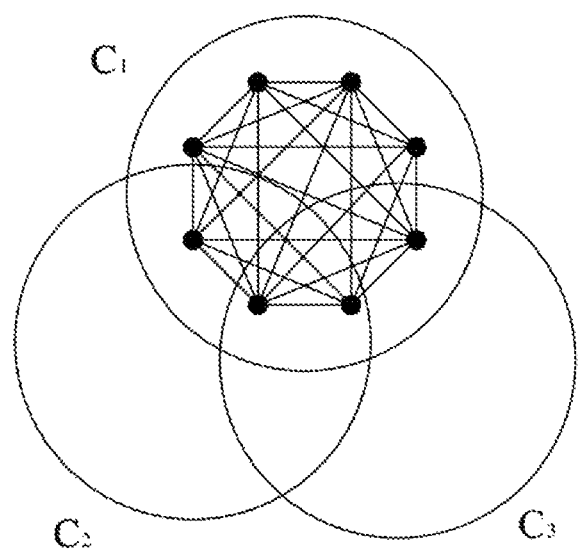

FIGS. 10A-10B show the relative size of maximal satisfiable cliques and the trigger conditions. In FIG. 10A, the average size of maximal SAT cliques is 250 in MIPS and the 8-trigger condition is relatively small which could possibly be covered by multiple cliques. For FIG. 10B, the average size of maximal SAT cliques is 20 in AES and the 8-trigger condition is relatively large which is less likely to be covered by multiple cliques.

As shown in FIG. 10A, a small satisfiable clique is more likely to be in the overlap areas of many maximal satisfiable cliques. As in the case of MIPS, an adversary is unlikely to construct a trigger condition that is close to the large average maximal clique size of around 250, considering area overhead and many other side-channel approaches. Therefore, TARMAC can easily activate a specific trigger condition by generating a test vector for any of the maximal satisfiable cliques that are a super set of the trigger condition.

On the other hand, 8 trigger points are quite close to the average maximal clique size which is around 20 in AES. As a result, it is less likely to activate the trigger condition by chance, since it is covered by a smaller number of maximal satisfiable cliques, as shown in FIG. 10B. In the worst case, when every group of 20 signals construct a maximal SAT clique, $$\binom{100}{20} \sim 2^{69}$$

test vectors are needed to cover all possible trigger conditions. Actually, it is the best any test generation approach can do when area and power constraints allow 20 trigger points. Compared to trying all possible trigger conditions which are in the order of $2^{100}$, it is still a huge improvement. Meanwhile, not all the designs have the same property as AES as shown previously. Many of the studied designs have a relatively large maximal satisfiable cliques compared to trigger points.

In summary, in accordance with the present disclosure, the problem of trigger activation is reduced and mapped to the problem of covering maximal satisfiable cliques. With the worst case of AES, the problem size is reduced from $2^{100}$ to $2^{69}$. This exemplary paradigm, in accordance with embodiments of the present disclosure, allows an adversary to construct any size of trigger condition, which is not reasonable considering area and power overhead. In one embodiment, random sampling can further reduce the problem size by selecting the representative maximal satisfiable cliques that are able to cover realistic trigger conditions. As in the MIPS example, each 8-trigger condition can possibly be covered by a large number of maximal satisfiable cliques of average size 250. With one of them being selected, the trigger activation problem can be solved. Alternatively, in one embodiment, instead of randomly sampling each time, a biased sampling technique can be beneficial to instruct the sampling process to cover cliques that have less overlap with already covered ones. For example, when clique $C_1$ has been covered, the priority of selecting $C_2$ and $C_3$ as the next target is wanted to be lowered. In this way, small trigger conditions are likely to be activated quickly.

Trigger activation is a fundamental challenge in detection of hardware Trojans. While prior efforts using statistical test generation are promising, they are neither scalable for large designs nor suitable for activating extremely rare trigger conditions in stealthy Trojans. In the present disclosure, a new paradigm is presented to solve trigger activation problem. Such an exemplary approach is the first attempt in mapping the problem of test generation for trigger activation to the problem of covering maximal satisfiability cliques, and the present disclosure shows that valid trigger conditions and satisfiability cliques are a one-to-one mapping. In accordance with various embodiments, the present disclosure presents efficient test generation algorithms to repeatedly sample maximal satisfiability cliques and generate a test vector for each of them. Experimental results demonstrate that an exemplary approach is both scalable and effective in generating efficient test vectors for a wide variety of trigger conditions. An exemplary approach outperforms the state-of-the-art techniques by several orders-of-magnitude in terms of trigger coverage and test length, as well as test generation time. Exemplary test generation algorithms can be utilized for activating extremely rare trigger conditions to fulfill diverse requirements such as an improvement of functional (trigger) coverage and side channel sensitivity.

Figure 11:
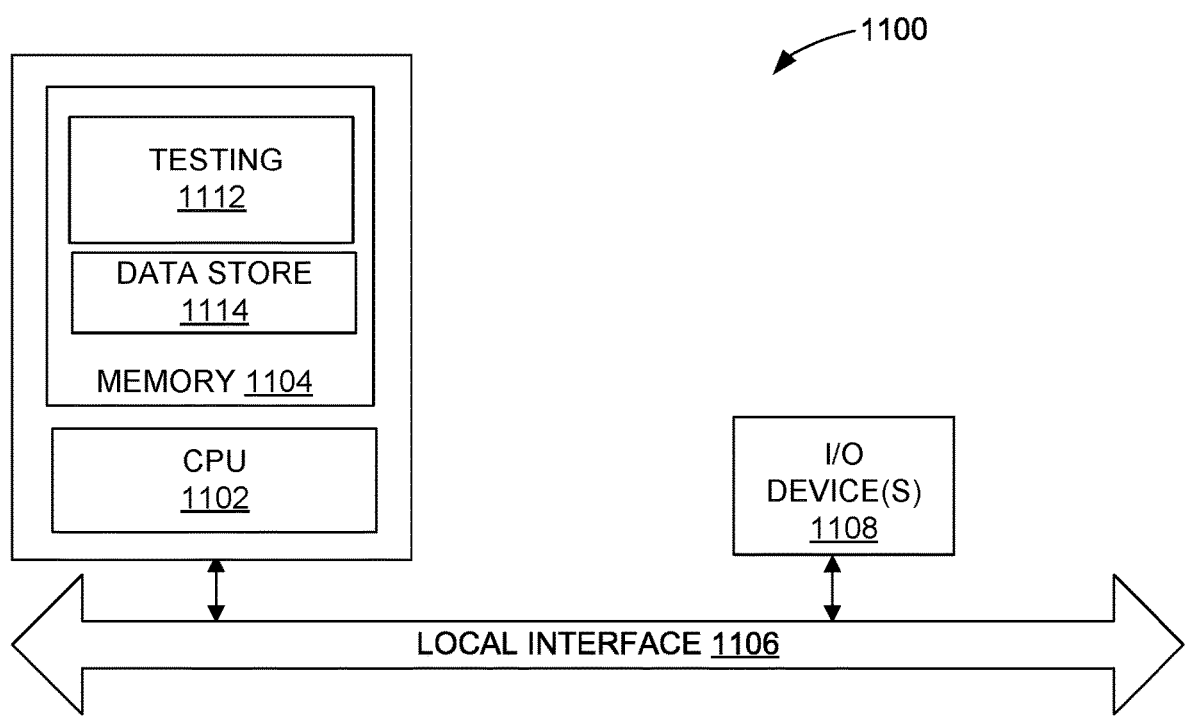
FIG. 11 depicts a schematic block diagram of a computing device that can be used to implement various embodiments of the present disclosure.

FIG. 11 depicts a schematic block diagram of a computing device 1100 that can be used to implement various embodiments of the present disclosure. An exemplary computing device 1100 includes at least one processor circuit, for example, having a processor 1102 and a memory 1104, both of which are coupled to a local interface 1106, and one or more input and output (I/O) devices 1108. The local interface 1106 may comprise, for example, a data bus with an accompanying address/control bus or other bus structure as can be appreciated.

Stored in the memory 1104 are both data and several components that are executable by the processor 1102. In particular, stored in the memory 1104 and executable by the processor 1102 are testing logic/instructions 1112 (e.g., Algorithm 3, Algorithm 4, etc.) that are configured to produce a test pattern based on maximal satisfiability clique sampling that can be applied to a circuit design under test. Also stored in the memory 1104 may be a data store 1114 and other data. The data store 1114 can include rareness threshold value(s), and potentially other data. In addition, an operating system may be stored in the memory 1104 and executable by the processor 1102. The I/O devices 1108 may include input devices, for example but not limited to, a keyboard, mouse, etc. Furthermore, the I/O devices 1108 may also include output devices, for example but not limited to, a printer, display, etc.

Certain embodiments of the present disclosure can be implemented in hardware, software, firmware, or a combination thereof. Embodiments implemented in software or firmware can be stored in a computer readable medium, such as memory, and that is executed by a suitable instruction execution system. If implemented in hardware, an alternative embodiment can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of certain embodiments of the present disclosure includes embodying the functionality of certain embodiments of the present disclosure in logic embodied in hardware or software-configured mediums.

It should be emphasized that the above-described embodiments of the present disclosure are merely possible examples of implementations, merely set forth for a clear understanding of the principles of the present disclosure. Many variations and modifications may be made to the above-described embodiment(s) of the present disclosure without departing substantially from the principles of the present disclosure. All such modifications and variations are intended to be included herein within the scope of this disclosure.

The invention claimed is:

1. A method comprising:
   obtaining, by a computing device, a design graph representation of an electronic circuit;
   constructing, by the computing device, a satisfiability graph from the design graph representation, wherein the satisfiability graph includes a set of vertices representing rare signals of the electronic circuit and satisfiability connections between the vertices;
   finding, by the computing device, a plurality of maximal satisfiable cliques in the satisfiability graph, wherein a maximal satisfiable clique corresponds to a triggering condition for a payload of the electronic circuit;
   generating, by the computing device, a test vector for each of the maximal satisfiable cliques; and
   performing, by the computing device, a test for a presence of a hardware Trojan circuit in the electronic circuit using the generated test vectors as input signals.

2. The method of claim 1, further comprising generating the design graph representation from a gate-level netlist for the electronic circuit.

3. The method of claim 1, wherein the plurality of maximal satisfiable cliques is all of the maximal satisfiable cliques in the satisfiability graph.

4. The method of claim 1, wherein the plurality of maximal satisfiable cliques is a subset of the maximal satisfiable cliques in the satisfiability graph.

5. The method of claim 4, wherein the plurality of maximal satisfiable cliques is found by a random sampling of valid trigger conditions that enable the payload of the electronic circuit.

6. The method of claim 4, wherein the plurality of maximal satisfiable cliques is found by a biased sampling of valid trigger conditions that enable the payload of the electronic circuit.

7. The method of claim 1, wherein an satisfiability solver is utilized to generate the test vector for each of the maximal satisfiable cliques.

8. The method of claim 1, wherein constructing the satisfiability graph comprises transforming the design graph representation to the satisfiability graph using a rareness threshold.

9. The method of claim 8, further comprising simulating the electronic circuit using random test vectors to record a number of times a signal output is generated; and determining a signal output to be a rare signal output when the signal output satisfies a specific value below the rareness threshold.

10. The method of claim 1, wherein the vertices of a particular maximal satisfiable clique are activated by application of a test vector corresponding to the maximal satisfiable clique to the electronic circuit.

11. A system comprising:
    one or more computing processors; and
    one or more memory storage elements;
    wherein the one or more computing processors are configured to:
       obtain a design graph representation of an electronic circuit;
       construct a satisfiability graph from the design graph representation, wherein the satisfiability graph includes a set of vertices representing rare signals of the electronic circuit and satisfiability connections between the vertices;
       find a plurality of maximal satisfiable cliques in the satisfiability graph, wherein a maximal satisfiable clique corresponds to a triggering condition for a payload of the electronic circuit;
       generate a test vector for each of the maximal satisfiable cliques; and
       perform a test for a presence of a hardware Trojan circuit in the electronic circuit using the generated test vectors as input signals.

12. The system of claim 11, wherein the one or more computing processors are further configured to generate the design graph representation from a gate-level netlist for the electronic circuit.

13. The system of claim 11, wherein the plurality of maximal satisfiable cliques is all of the maximal satisfiable cliques in the satisfiability graph.

14. The system of claim 11, wherein the plurality of maximal satisfiable cliques is a subset of the maximal satisfiable cliques in the satisfiability graph, wherein the plurality of maximal satisfiable cliques is found by a random sampling of valid trigger conditions that enable a payload of the electronic circuit.

15. The system of claim 11, wherein the plurality of maximal satisfiable cliques is a subset of the maximal satisfiable cliques in the satisfiability graph, wherein the plurality of maximal satisfiable cliques is found by a biased sampling of valid trigger conditions that enable a payload of the electronic circuit.

16. The system of claim 11, wherein an satisfiability solver is utilized to generate the test vector for each of the maximal satisfiable cliques.

17. The system of claim 11, wherein constructing the satisfiability graph comprises transforming the design graph representation to the satisfiability graph using a rareness threshold.

18. The system of claim 17, wherein the one or more computing processors are further configured to simulate the electronic circuit using random test vectors to record a number of times a signal output is generated; and determining a signal output to be a rare signal output when the signal output satisfies a specific value below the rareness threshold.

19. The system of claim 11, wherein the vertices of a particular maximal satisfiable clique are activated by application of a test vector corresponding to the maximal satisfiable clique to the electronic circuit.

20. A non-transitory computer-readable medium having instructions stored thereon that, in response to execution by a computer-based system, cause the computer-based system to perform operations comprising:
   obtaining a design graph representation of an electronic circuit;
   constructing a satisfiability graph from the design graph representation, wherein the satisfiability graph includes a set of vertices representing rare signals of the electronic circuit and satisfiability connections between the vertices;
   finding a plurality of maximal satisfiable cliques in the satisfiability graph, wherein a maximal satisfiable clique corresponds to a triggering condition for a payload of the electronic circuit;
   generating a test vector for each of the maximal satisfiable cliques; and
   performing a test for a presence of a hardware Trojan circuit in the electronic circuit using the generated test vectors as input signals.

* * * * *